(12) United States Patent
Schoenebeck

(10) Patent No.: US 9,095,976 B1
(45) Date of Patent: Aug. 4, 2015

(54) LOCATION MARKING DEVICE OF A SUPPORT FOR A MOUNTABLE OBJECT

(71) Applicant: Scott Schoenebeck, Salt Lake City, UT (US)

(72) Inventor: Scott Schoenebeck, Salt Lake City, UT (US)

(*) Notice: Subject to any disclaimer, the term of this patent is extended or adjusted under 35 U.S.C. 154(b) by 34 days.

(21) Appl. No.: 14/140,762

(22) Filed: Dec. 26, 2013

Related U.S. Application Data

(63) Continuation-in-part of application No. 13/304,849, filed on Nov. 28, 2011, now Pat. No. 8,615,894, which is a continuation-in-part of application No. 12/478,322, filed on Jun. 4, 2009, now Pat. No. 8,082,675.

(60) Provisional application No. 61/058,664, filed on Jun. 4, 2008.

(51) Int. Cl.
*G01D 21/00* (2006.01)
*B25H 7/00* (2006.01)
*B25H 7/04* (2006.01)

(52) U.S. Cl.
CPC .................. *B25H 7/045* (2013.01); *B25H 7/00* (2013.01); *G01D 21/00* (2013.01)

(58) Field of Classification Search
CPC ................................... G01D 21/00; B25H 7/00
USPC ........... 33/613, 666, 644, 645, 662, 669, 670, 33/671, 679, 574–579
See application file for complete search history.

(56) References Cited

U.S. PATENT DOCUMENTS

| | | |
|---|---|---|
| 4,893,776 A | 1/1990 | Floyd |
| 4,944,094 A | 7/1990 | Depiano et al. |
| 4,993,168 A | 2/1991 | Acuna |
| 5,103,573 A | 4/1992 | Ehling et al. |
| 5,165,650 A | 11/1992 | Letizia |
| 5,398,906 A | 3/1995 | Aydelott |
| 5,829,152 A | 11/1998 | Potter et al. |
| 6,185,831 B1 | 2/2001 | Plucinnik |
| 6,311,407 B1 | 11/2001 | Muraishi |
| 6,952,887 B2 | 10/2005 | Muchnik |
| D513,575 S | 1/2006 | Carson et al. |
| 7,159,329 B2 | 1/2007 | Dolenz et al. |
| 7,185,442 B2 | 3/2007 | Grillo |
| 7,234,245 B2 | 6/2007 | Tatum |
| 7,293,925 B1 * | 11/2007 | Sanseviero ...................... 33/613 |

(Continued)

OTHER PUBLICATIONS

Hang and Level; Learn About the Features of the Gool; Under the Roof Inc.; Mar. 6, 2008; 6 pages.

(Continued)

*Primary Examiner* — Yaritza Guadalupe-McCall
(74) *Attorney, Agent, or Firm* — Thorpe North & Western LLC

(57) ABSTRACT

A marking device for marking the location for a support for a mountable object, such as a picture frame, has a body with a compressible or collapsible configuration and adhesive for removably attaching a back face to a backside of the mountable object. A primary marker is coupled to the body and disposed below a front face in an uncompressed configuration and projects at least to the front face to mark the surface in the compressed configuration. The marker is disposed adjacent a perimeter edge of the body to facilitate alignment. A sighting notch can be formed in the body with the marker at the apex of the notch to facilitate alignment. A secondary marker is removably coupled to the body for harder surfaces.

20 Claims, 15 Drawing Sheets

(56) References Cited

U.S. PATENT DOCUMENTS

| | | |
|---|---|---|
| 7,380,346 B1 | 6/2008 | Emerson |
| 7,676,946 B2 | 3/2010 | Page |
| 8,082,675 B1 | 12/2011 | Schoenebeck |
| 8,615,894 B1 | 12/2013 | Schoenebeck |
| 8,819,948 B2 * | 9/2014 | Chamberlain ............ 33/41.5 |
| 2002/0066200 A1 | 6/2002 | Lombardo |
| 2004/0098875 A1 | 5/2004 | Gould |
| 2004/0216319 A1 * | 11/2004 | Muchnik ............... 33/666 |
| 2006/0075650 A1 | 4/2006 | Tatum |
| 2007/0119068 A1 | 5/2007 | Horst |
| 2007/0283588 A1 | 12/2007 | Gardner et al. |
| 2012/0124847 A1 * | 5/2012 | Chamberlain ............ 33/41.5 |

OTHER PUBLICATIONS

ATCI Categories; Wallsaver Picture Hanging Tool, 3 pages; Applicant believes that the ATCI Categories may have been offered for sale prior to the filing date of application.

Your Source for Fine-Art Frame Destination; Photography Frames; 3 pages; Applicant believes that this product may have been offered for sale prior to the filing date of the application, 2008.

Picture-Plumb, The Original Picture Hanging Tool; 2002; 3 pages.

The Family Handyman; Positioning Pictures with Thumbtacks; Nov. 2000; p. 42.

\* cited by examiner

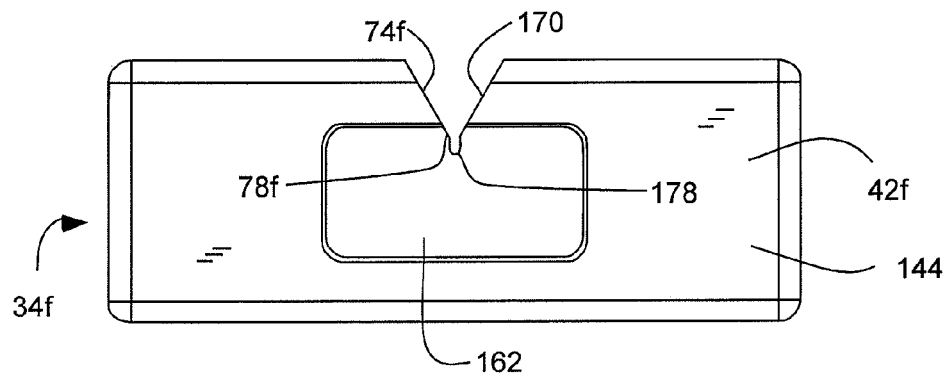
Fig. 9b
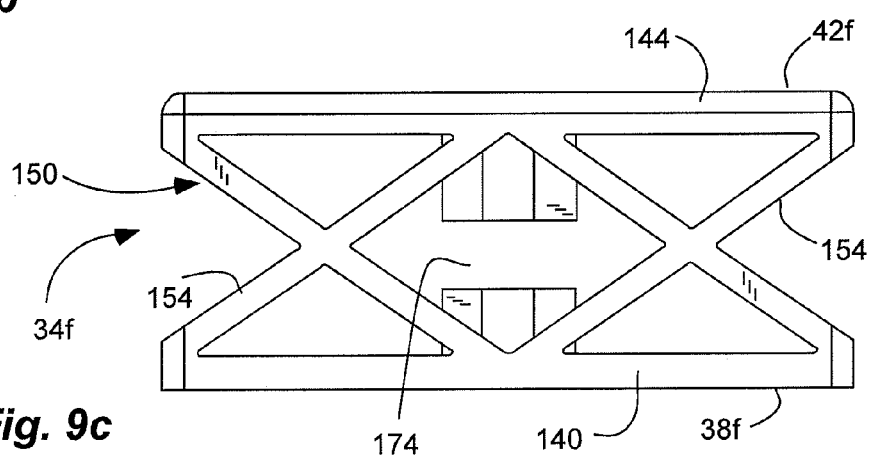
Fig. 9c
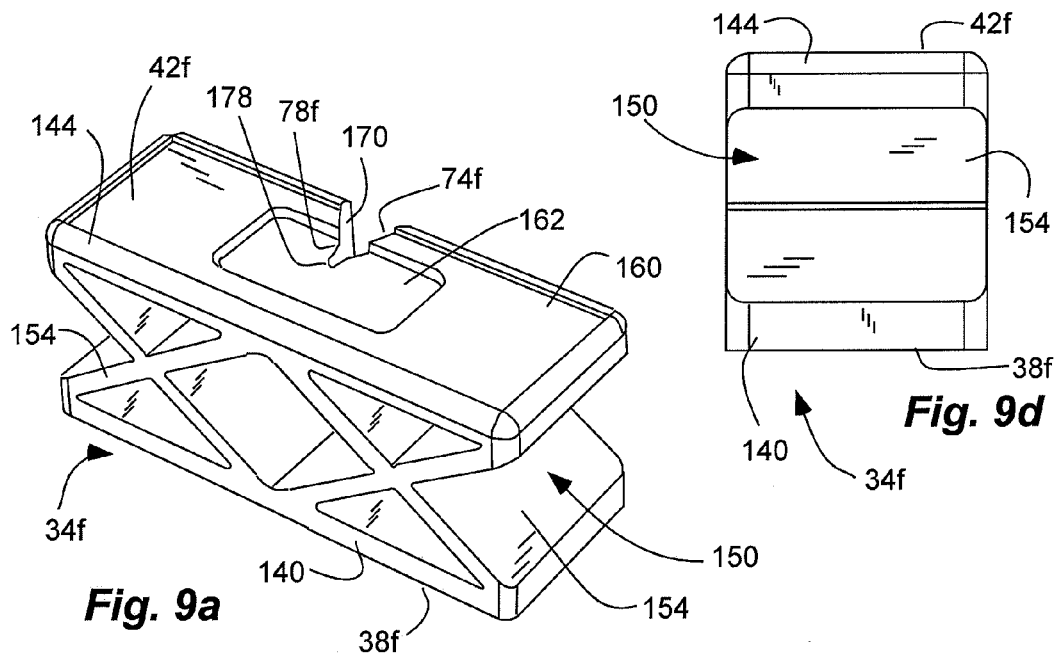
Fig. 9a
Fig. 9d

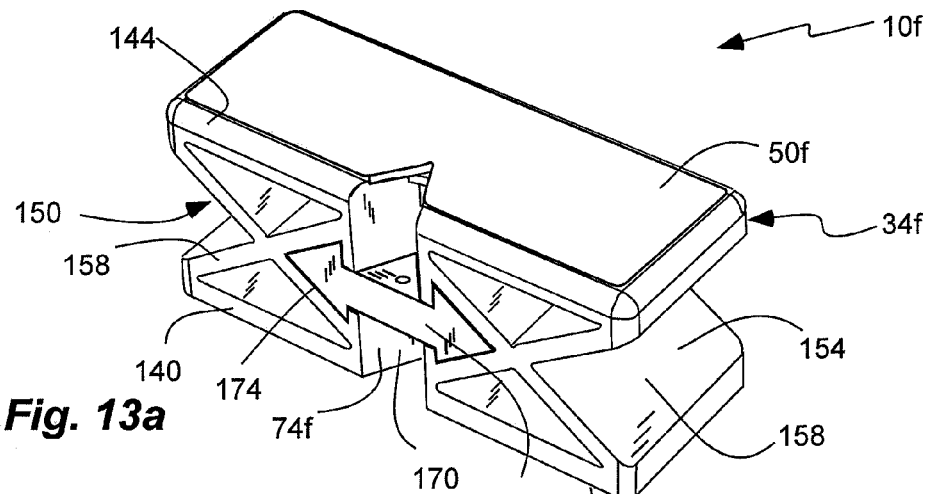
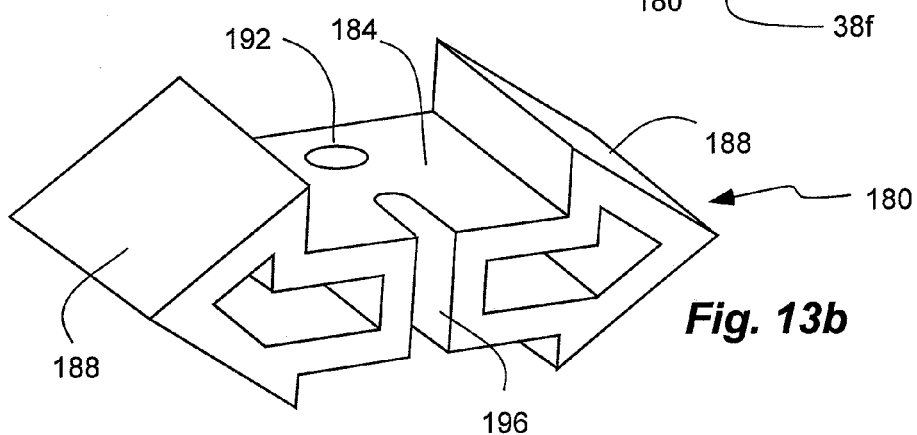
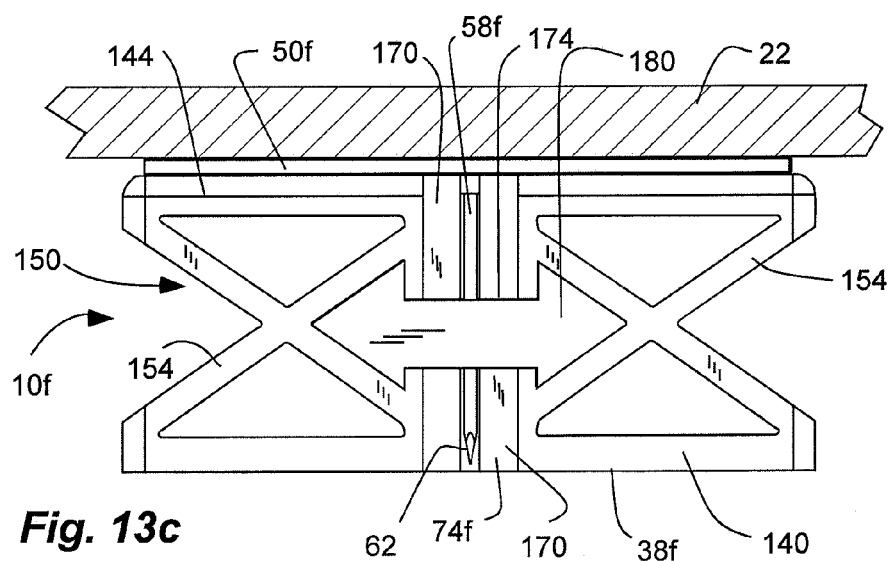

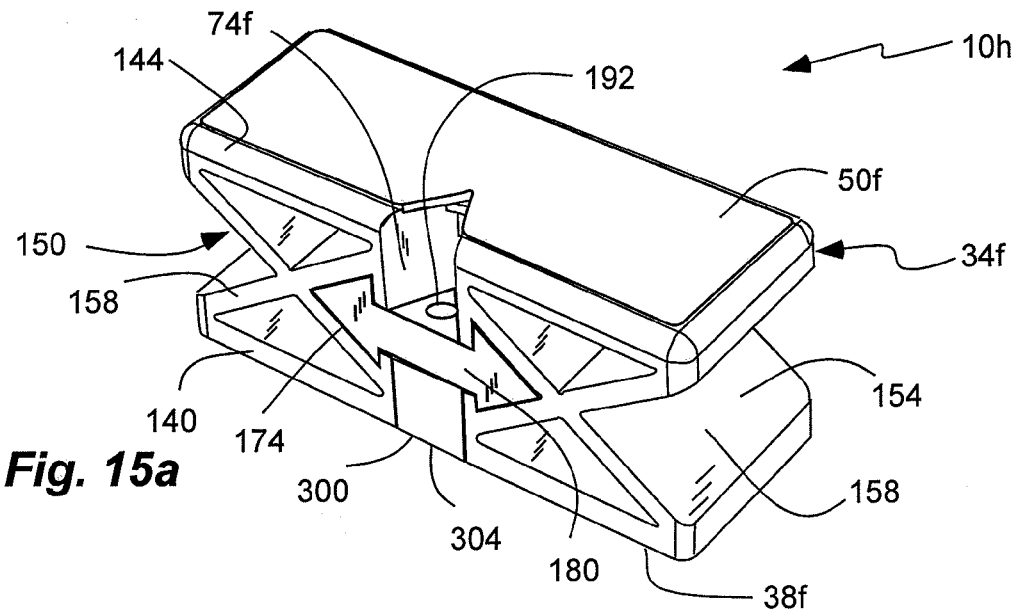
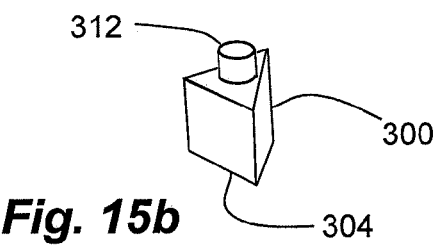
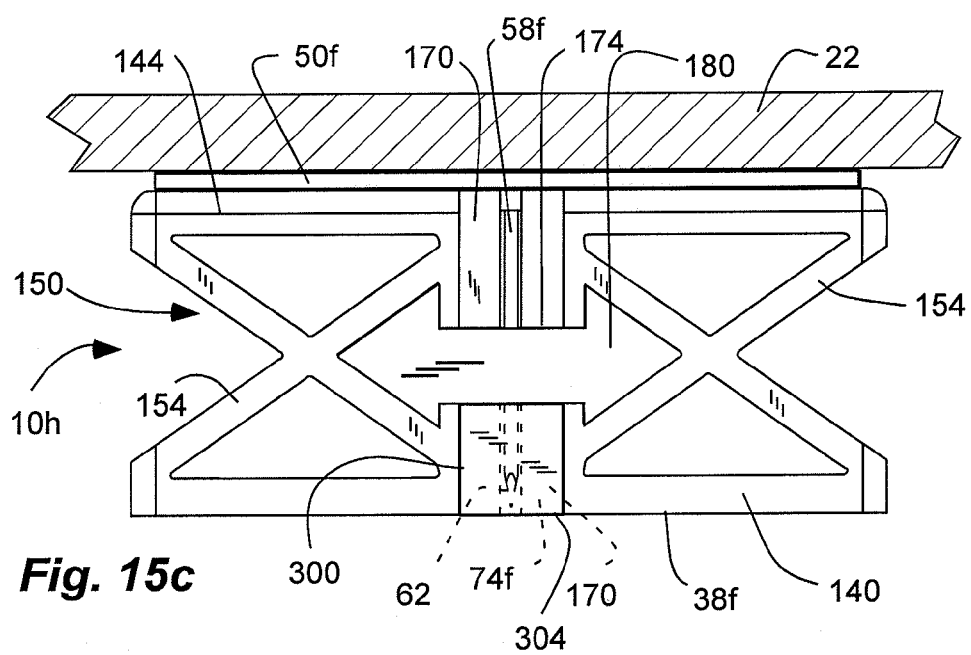

LOCATION MARKING DEVICE OF A SUPPORT FOR A MOUNTABLE OBJECT

PRIORITY CLAIM

This is a continuation-in-part of U.S. patent application Ser. No. 13/304,849, filed Nov. 28, 2011, now U.S. Pat. No. 8,615,894; which is a continuation-in-part of U.S. patent application Ser. No. 12/478,322, filed Jun. 4, 2009, now U.S. Pat. No. 8,082,675; which claims priority to U.S. Provisional Patent Application Ser. No. 61/058,664, filed Jun. 4, 2008, which are hereby incorporated herein by reference in their entirety.

BACKGROUND

1. Field of the Invention

The present invention relates generally to an aid for marking the location of a support, such as a nail or hanger, for a mountable object, such as a picture frame or the like.

2. Related Art

Hanging a picture frame or the like on a wall can be a difficult process because it is natural to hold the frame against the wall to find the desired location, while the bracket on the back of the frame is hidden from view by the frame itself, making the location of a nail or hanger on the wall difficult to ascertain. Marking devices have been proposed that attached to the back of the frame at the location of the bracket to mark the wall when the frame is located as desired. For example, see U.S. Pat. Nos. 6,952,887; 7,234,245; and 7,293,925. Some such devices, however, require that the device be placed over the bracket, thus hiding the bracket from view and making it difficult to align the device itself with the bracket. In addition, it can be difficult to hand items on hard surfaces, such as tile.

SUMMARY OF THE INVENTION

It has been recognized that it would be advantageous to develop a method and device for locating a support on a surface or wall to mount a mountable object, such as a picture frame or the like. In addition, it has been recognized that it would be advantageous to develop a method and device to facilitate marking a hard surface, such as tile, stone, metal or glass, to receive a support for a mountable object, such as a soap dispenser, paper towel dispenser, tampon receptacle, ADA grab bar, etc.

The invention provides a marking device for marking the location for a support for a mountable object, such as a soap dispenser. A body has a front face and a back face, with the front face being configured for contact against a surface. An adhesive is coupled to the back face of the body configured to removably couple the back face of the body to the mountable object. An elastic buckling frame forms at least a portion of the body and has elastic and collapsible cross-braces between the front and back faces. The cross-braces include a flexible and resilient material such that the cross-braces buckle under an applied force defining a compressed configuration in which the front face displaces towards the back face to reduce a thickness of the body, and the cross-braces return to an original configuration upon removal of the applied force defining an uncompressed configuration in which the front face displaces away from the back face to increase a thickness of the body. A primary marker is coupled to the body and disposed below the front face in the thicker configuration, and projects to at least the front face to mark the surface in the compressed configuration. A secondary marker is coupled to the body and has a marking pad extending adjacent the front face of the body.

In accordance with a more detailed aspect of the invention, the secondary marker can include an adhesive adhering the marking pad to the front face. A sighting notch can be formed in the marking pad and can extend therethrough. The sighting notch of the marking pad can be aligned with the sighting notch of the body.

In accordance with a more detailed aspect of the invention, the marking device can include a sighting notch formed in a lateral perimeter edge of the body and can extend through the body from the front face to the back face. The primary marker can be disposed adjacent an apex of the sighting notch. A rigid safety key can be removably disposable in the buckling frame to resist buckling of the cross-braces. A hole can extend through the rigid safety key and aligned with the sighting notch. The secondary marker can include a block removably extending from a proximal end at the safety key to a distal end adjacent the front face of the body. A pin can extending from the block and can be removably disposed in the hole of the safety key. The marking pad can be disposed on the distal end of the block.

In accordance with a more detailed aspect of the invention, the secondary marker can include a clip with a rear wall engaging the body and a front wall disposed over the front face of the body. The marking pad can be disposed on the front wall of the clip.

In accordance with a more detailed aspect of the invention, the marking device can include a sighting notch formed in a lateral perimeter edge of the body and extending through the body from the front face to the back face. The primary marker can be disposed adjacent an apex of the sighting notch. The secondary marker can include a clip with a rear wall engaging the body and a front wall disposed over the front face of the body and across the sighting notch. The marking pad can be disposed on the front wall of the clip and across the sighting notch.

In addition, the invention provides a marking device for marking the location for a support for a mountable object. A compressible body has a front face and a back face. The front face is configured for contact against a surface. The compressible body has a compressed configuration that is thinner and a thicker configuration that is thicker than the compressed configuration. An adhesive is coupled to the back face of the compressible body.

A primary marker is coupled to the compressible body and disposed below the front face in the thicker configuration, and projects to at least the front face to mark the surface in the compressed configuration. A sighting notch is formed in a lateral perimeter edge of the compressible body, and extends through the body from the front face to the back face. The primary marker is disposed adjacent an apex of the sighting notch. A secondary marker is coupled to the body, and has a marking pad extending adjacent the front face of the body.

In accordance with a more detailed aspect of the invention, the secondary marker can include an adhesive adhering the marking pad to the front face of the body. A sighting notch can be formed in the marking pad and can extend therethrough. The sighting notch of the marking pad can be aligned with the sighting notch of the body.

In accordance with a more detailed aspect of the invention, the marking device can include an elastic buckling frame forming at least a portion of the body, and can have elastic and collapsible cross-braces between the front and back faces. The cross-braces can include a flexible and resilient material such that the cross-braces buckle under an applied force in the compressed configuration, and the cross-braces return to an original configuration upon removal of the applied force in the thicker configuration. A rigid safety key can be removably disposable in the buckling frame to resist buckling of the cross-braces. A hole can extend through the rigid safety key and can be aligned with the sighting notch. The secondary marker can include a block removably extending from a proximal end at the safety key to a distal end beyond the front face of the body. A pin can extend from the block and can be removably disposed in the hole of the safety key. The marking pad can be disposed on the distal end of the block.

In accordance with a more detailed aspect of the invention, the secondary marker can include a clip with a rear wall engaging the body and a front wall disposed over the front face of the body and across the sighting notch. The marking pad can disposed on the front wall of the clip and across the sighting notch.

Furthermore, the invention provides a method of marking the location of a support for a mountable object on a surface, the method comprising:
 obtaining at least one marking device comprising:
  a compressible or collapsible body with a front face and a back face with an adhesive;
  a primary marker coupled to the body;
 viewing a connection point on a backside of the mountable object through a sighting notch of the marking device and aligning an apex of the sighting notch of the marking device with the connection point;
 attaching the marking device to the backside of the mountable object, the connection point, or both, with the adhesive;
 attaching a secondary marker to the body and aligned with the sighting notch;
 supporting the mountable object opposing the surface;
 moving the mountable object until a desired position is found; and pressing the mountable object against the surface to press a marking pad of the secondary marker against the surface and marking a location of a support on the surface with the secondary marker.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 2a is a perspective view of the marking device of FIG. 1a;

FIG. 2b is a front view of the marking device of FIG. 2a;

FIG. 2c is a top view of the marking device of FIG. 2a;

FIG. 2d is a rear view of the marking device of FIG. 2a;

FIG. 2g is a side view of the marking device of FIG. 2a;

FIG. 4b is a top view of the marking device of FIG. 4a;

FIG. 4c is a cross-sectional side view of the marking device of FIG. 4a;

FIG. 4d is a side view of the marking device of FIG. 4a;

FIG. 5b is a top view of the marking device of FIG. 5a;

FIG. 5c is a cross-sectional side view of the marking device of FIG. 5a;

FIG. 6b is a top view of the marking device of FIG. 6a;

FIG. 6c is a cross-sectional side view of the marking device of FIG. 6a;

FIG. 7b is a top view of the marking device of FIG. 7a;

FIG. 7c is a cross-sectional side view of the marking device of FIG. 7a;

FIG. 8b is a top view of the marking device of FIG. 8a;

FIG. 9a is a perspective view of a body of the marking device of FIG. 8a;

FIG. 9b is a rear view of the body of the marking device of FIG. 8a;

FIG. 9c is a bottom view of the body of the marking device of FIG. 8a;

FIG. 9d is a side view of the body of the marking device of FIG. 8a;

FIG. 10a is a rear view of a marker of the marking device of FIG. 8a;

FIG. 10b is a top view of the marker of the marking device of FIG. 8a;

FIG. 10c is a side view of the marker of the marking device of FIG. 8a;

FIG. 13a is perspective view of the marking device of FIG. 8a with a safety key or plug in accordance with an embodiment of the present invention;

FIG. 13b is a perspective view of the safety key or plug of the marking device of FIG. 13a;

FIG. 13c is a top view of the marking device of FIG. 8a with the safety key or plug;

FIG. 15a is a perspective view of another marking device in accordance with another embodiment of the present invention;

FIG. 15b is a perspective view of a stud of a secondary marker of the marking device of FIG. 15a;

FIG. 15c is a top view of the marking device of FIG. 15a; and

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 1A:
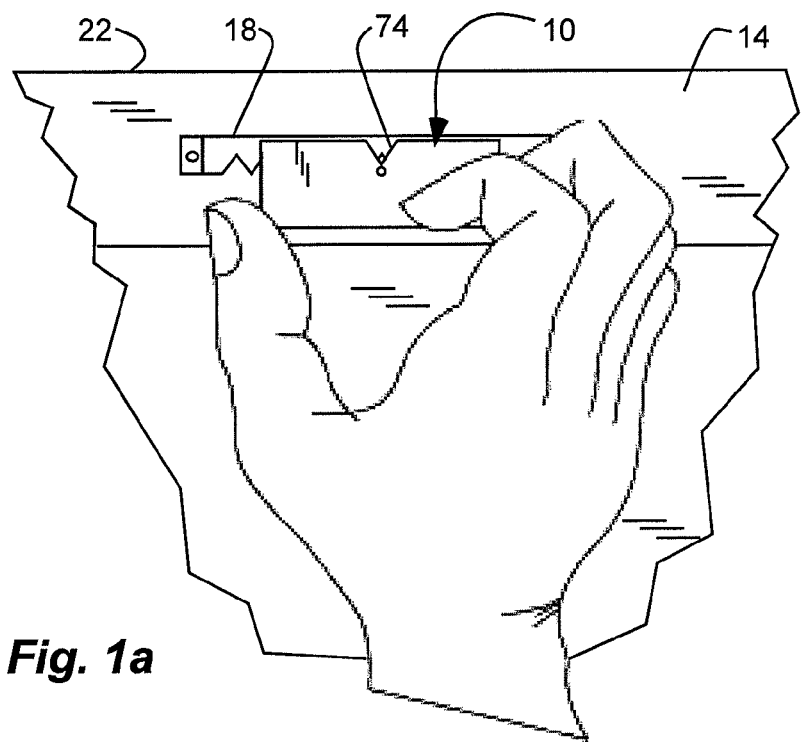
FIG. 1a is a front schematic view of a marking device in accordance with an embodiment of the present invention shown being positioned on a backside of a mountable object and aligned with a connection point, namely a sawtooth hanger.

Illustrated in FIGS. 1a-2g is an exemplary embodiment of the present invention for a Location Marking Device of a Support for a Mountable Object. As shown in FIGS. 1a-1c, the present invention generally comprises a marking device 10 that can be attached to the backside 14 and/or connection point 18 of a mountable object 22, such as a framed picture or painting, and used to mark the location of a support on a support surface 26, such as a wall. The mountable object 22 can include any object mountable on a wall, including for example, frames, picture frames, plates, mirrors, shelves, hooks, bars, etc. The connection point 18 can be any mechanism for hanging the picture frame, including for example, saw tooth bracket(s) (FIGS. 1a, 1b and 1e), loop(s) (FIGS. 1f and 1g), eyelet(s) (FIGS. 1h and 1i), cable(s) (FIGS. 1j and 1k), hole(s) for a towel bar (FIG. 1L), etc., that are secured to the back side 14 of the frame to receive any type of support 30 (FIG. 3), such as nail(s), hook(s), etc., secured to the support surface 26 or wall.

The marking device 10 can have a body 34 with a front slick or low-friction slidable face 38 and a back face 42 which can be substantially planar or flat, and parallel to one another. The front face 38 can be smooth and slick or slippery, or can be provided with a non-stick or low-friction coating or cover that allows for sliding and easy movement over a support surface or wall. The front face can be planar or flat to provide a broad surface area with reduced pressure concentrations to slide over the support surface or wall. The body 34 can be formed or, or can include, a compressible foam such that the body is compressible and flexible. The foam can be a 2 lb. EVA cross-linked foam, neoprene or the like. In addition, the foam can include multiple layers, such as a more rigid (higher durometer) front layer and a less rigid (lower durometer) back layer. The body 34 can have a compressed configuration that is thinner $t_2$ (FIG. 2f), and a thicker $t_1$, uncompressed configuration that is thicker ($t_1 > t_2$) than the compressed configuration (FIG. 2e), as described in greater detail below. The front face 38 can be displaceable towards the back face 42 to reduce a thickness of the body under an applied force in the compressed configuration, and displaceable away from the back face to increase a thickness of the body in the ticker, uncompressed configuration. In addition, the body 34 can be flexible and can have an unflexed configuration (FIGS. 2a-e), and a flexed or bent configuration (FIG. 1c) so that the body can conform to various surface irregularities in the back of the mountable object or can accommodate various different connection points. The body 34, and front and back faces thereof, can have a rectangular/rectilinear or square shape forming a block as illustrated, or can have a circular, oblong, or elliptical shape, or any other useful shape as can be appreciated by one having skill in the art. In another aspect of the present invention, the back face of the marking block can be contoured to match the contours of the backside of the mountable object; for instance, a curved or notched backside surface of a picture frame. Thus, the back face of the marking block can fit securely against the backside of the mountable object while orientating and maintaining the front face parallel to the primary plane of the mountable object, such as the plane of a picture or photograph or the base of a sculpture. The body 34 can also have an elongated shape with elongated lateral sides 46a and 46b that can facilitate being held and positioned (FIG. 1a) and can facilitate attachment to the mountable object and/or connection point.

A tacky adhesive 50 can be coupled to the back face 42 of the body to removably adhere the body to the mountable object and/or connection point. The back face of the body can be substantially exposed and the tacky adhesive can be applied directly to the body, or compressible foam thereof. A release liner or paper coverlet (not shown) can be disposed over the adhesive until ready for use; at which time the release liner or paper coverlet can be pealed from the adhesive and body. The tacky adhesive is one example of means for removably coupling the back face of the body to the backside of the mountable object at the connection point. Thus, the back side of the body or device has an adhesive surface. It will be appreciated that other means can be used, including for example, a strip of double-sided tape, a magnet, etc. In an alternative embodiment the back face could also be formed as part of a rigid frame which would allow for removably attaching the marking device to the backside of the mountable object with mechanical fasteners.

The device 10 also includes a primary marker 58 or marking implement coupled to or associated with the body 34. The marker 58 can be a pointed pin having a hard, pointed tip 62 positioned near the front face but below the front face in the thicker, uncompressed configuration. The marker can remain behind or below the front face of the marking device or body during attachment of the marking device or body to the mountable object and/or connection point, and subsequent movement of the mountable object towards the proper location. The marker or tip 62 can project to at least the front face in the compressed configuration (FIG. 2f) so that it can contact and/or penetrate the support surface and leave a mark, scratch or indentation. Once the mountable object is positioned correctly, the implement can be caused to project out of the front face to mark the location of an anchor or support upon which the mountable object is to be positioned, hung or otherwise attached. This can be accomplished by compressing the marking block through pressure applied directly to the mountable object. The marker 58 can also have a marker plate or head 66 to which the pin is mounted and supported. The marker plate or head 66 can abut to the back face of the body, and the adhesive and release liner can be disposed over the marker plate or head. The marker plate or head can be rigid to support the pin, while the body extends beyond the marker plate or head and can be flexible to conform to the mountable object and/or connection point.

The marker can be capable of marking any surface that comes in contact with the tip of the marker, indicating to the user the proper place or places to install the anchors or supports for supporting the mountable object. In an alternative embodiment, the marking implement can be a small pen or pencil, chalk, sticky bullets, or any other device or material that is capable of leaving a visible mark on the surface when the mountable object is removed.

Figure 1B:
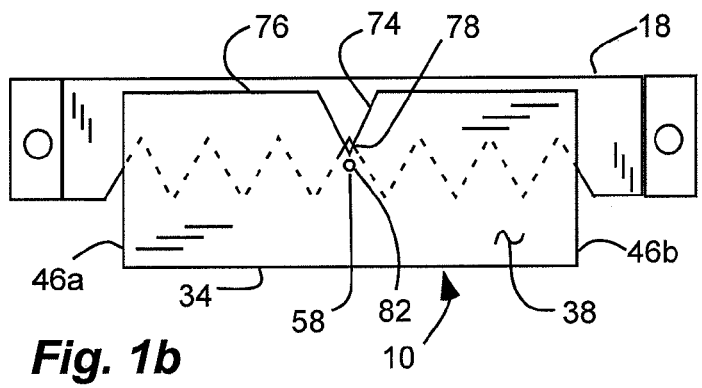
FIG. 1b is a front schematic view of the marking device of FIG. 1a, shown aligned with a connection point, namely a sawtooth hanger.
Figure 1C:
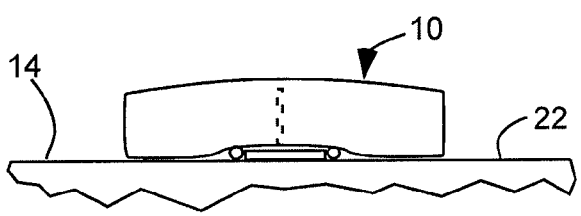
FIG. 1c is a bottom schematic view of the marking device of FIG. 1a, shown attached to a connection point on a backside of a mountable object.
Figure 4A:
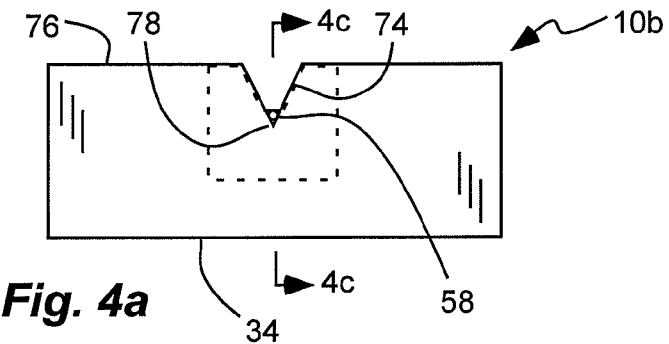
FIG. 4a is a front view of another marking device in accordance with another embodiment of the present invention.
Figure 4C:
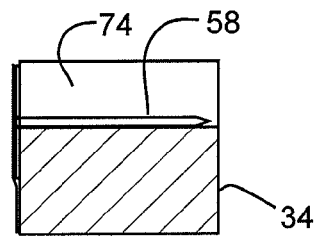
Figure 4B:
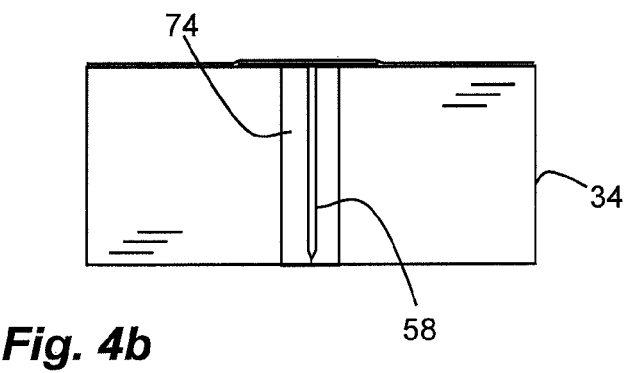
Figure 4D:
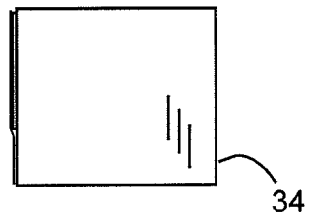

The back face of the marking device and body can be removably attached to the backside of the mountable object at a projected connection point for the support. The marking device can include a sighting or alignment notch 74, or gun sight, to assist with aligning the block to the projected connection point. The sighting notch 74 can be formed in a lateral perimeter edge 76 of the marking device and body, and can extend through a thickness of the device and body from the front face through the back face. In addition, the sighting notch can extend through the marker plate or head of the marker. Thus, the connection point of the mountable body is viewable through the sighting notch during placement. The marker 58 is disposed adjacent the apex 78 of the sighting notch 74. Therefore, the marker 58 can be more easily aligned with the connection point by viewing the connection point through the sighting notch, and aligning the apex, and thus the marker, with the connection point, as shown in FIGS. 1a and 1b. The sighting notch and marker can be located midway between the lateral sides 46a and b of the body to facilitate handling of the device (FIG. 1a) and attachment of the device to the mountable object and/or connection point (FIG. 1c). The sighting notch can be V-shaped, as shown. The marker can be disposed in the body, and within a perimeter of the body, adjacent the apex or tip of the alignment notch. The sighting notch forms a concave indentation or recess in the lateral perimeter edge of the body causing the marker to be disposed adjacent the perimeter edge of the body and/or device; which can make the marker easier to locate with respect to the connection point of the mountable object. The marker can be disposed in, and can form, a cavity or bore 82 that is exposed or open to identify or confirm the exit point of the marker. Thus, the body can surround a lateral side of the marker, while the tip is exposed or visible. It is believed that exposing the tip visually assists in alignment with the connection point and reduces the urge of the user to compress the foam to find the marker and inadvertently lancing the user's finger. Alternatively, the marker can be located at the apex, so that part of the pin is adjacent the body and part is exposed in the alignment notch. Thus, the marker is both supported by the body and visible. Similarly, the marker can be wholly or partially disposed in the alignment notch, as shown in FIGS. 4a-c, so that the marker is outside the body or perimeter thereof. Such placement of the marker can further facilitate alignment with the connection point during use. The sighting notch is an example of one means for identifying a location of the marker with respect to the body, and for aligning the marker with the connection point of the mountable object.

Figure 1D:
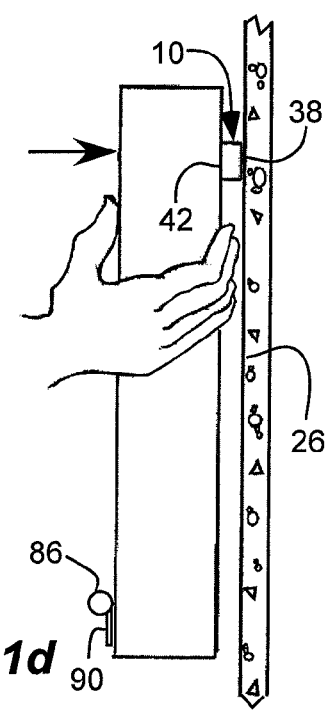
FIG. 1d is a side schematic view of the marking device of FIG. 1a, shown attached to a mountable object and being positioned on a support surface or wall.
Figure 1E:
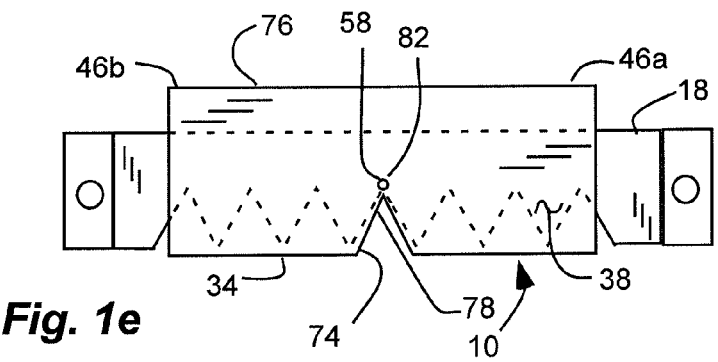
FIG. 1e is a front schematic view of the marking device of FIG. 1a, shown aligned with a connection point, namely a sawtooth hanger.
Figure 1F:
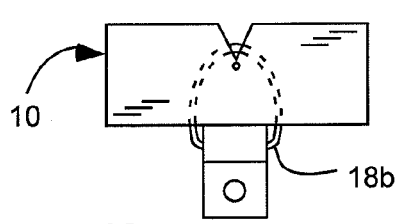
FIG. 1f is a front schematic view of the marking device of FIG. 1a, shown aligned with a connection point, namely a loop or hook.
Figure 1G:
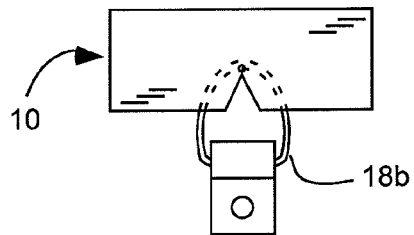
FIG. 1g is a front schematic view of the marking device of FIG. 1a, shown aligned with a connection point, namely a loop or hook.
Figure 1H:
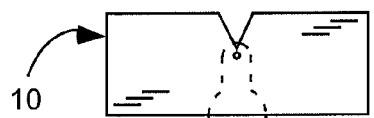
FIG. 1h is a front schematic view of the marking device of FIG. 1a, shown aligned with a connection point, namely an eyelet.
Figure 1I:
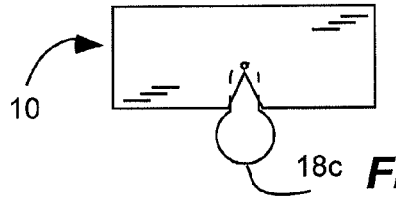
FIG. 1i is a front schematic view of the marking device of FIG. 1a, shown aligned with a connection point, namely an eyelet.
Figure 1J:
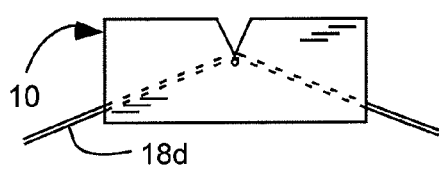
FIG. 1j is a front schematic view of the marking device of FIG. 1a, shown aligned with a connection point, namely a cable or wire.
Figure 1K:
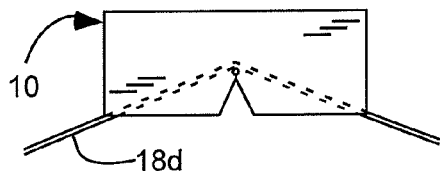
FIG. 1k is a front schematic view of the marking device of FIG. 1a, shown aligned with a connection point, namely a cable or wire.
Figure 1L:
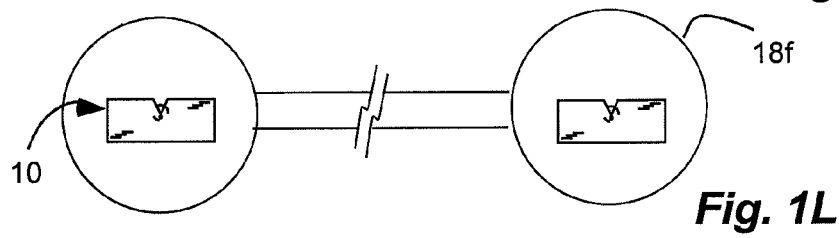
FIG. 1L is a front schematic view of the marking device of FIG. 1a, shown aligned with a connection point, namely a towel bar.
Figure 2A:
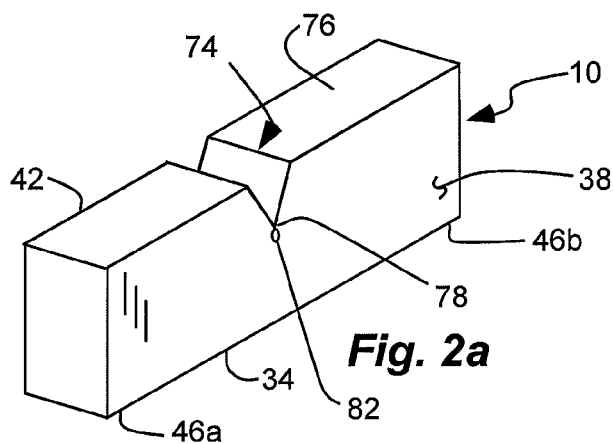
Figure 2B:
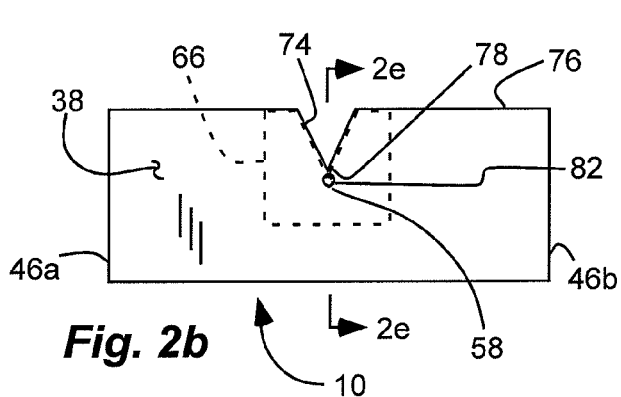
Figure 2E:
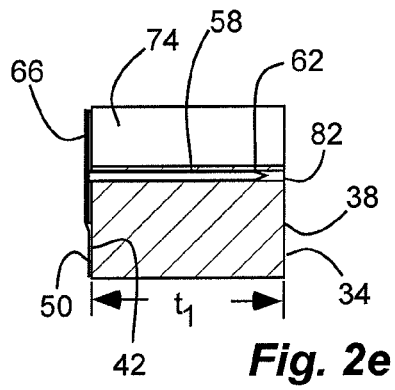
FIG. 2e is a cross-sectional side view of the marking device of FIG. 2a, shown in a thicker, non-compressed configuration.
Figure 2C:
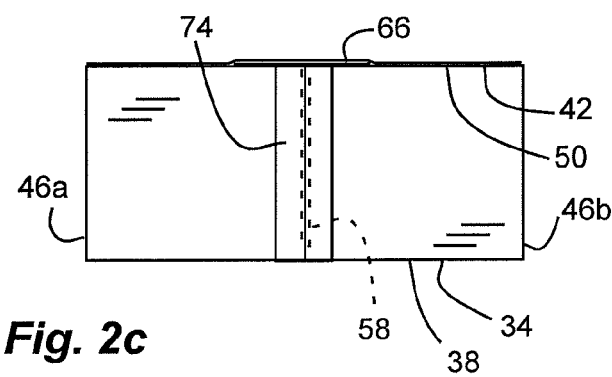
Figure 2F:
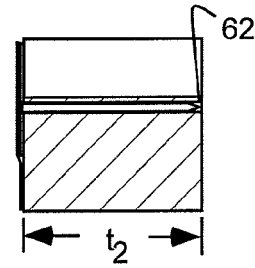
FIG. 2f is a cross-sectional side view of the marking device of FIG. 2a, shown in a thinner, compressed configuration.
Figure 2D:
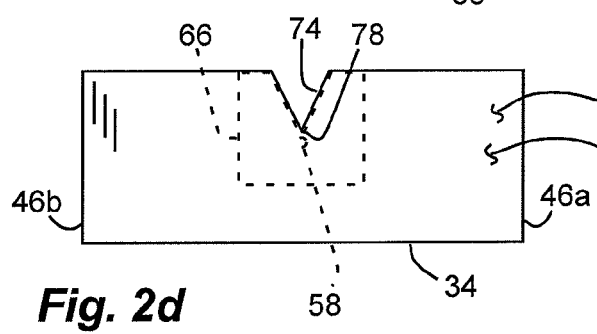
Figure 2G:
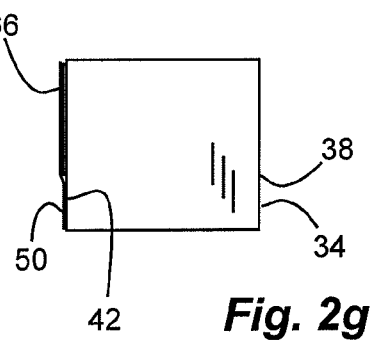

The alignment notch can be aligned with the connection point in an upright configuration, as shown in FIG. 1b, or in an upside down configuration as shown in FIG. 1e. Alternatively, the alignment notch can be oriented at any angle convenient to the user. Thus, the marking device can be held in an ergonomically suitable fashion and can accommodate any connection point or backside configuration of the mountable object. Referring to FIGS. 1f and 1g, the marking device can be used with loop or hook type connection points 18b, in either an upright or upside down configuration, as shown, or another configuration if desired. Referring to FIGS. 1h and 1i, the marking device can be used with an eyelet type connection point 18c, in either an upright or upside down configuration, as shown, or another configuration if desired. Referring to FIGS. 1j and 1k, the marking device can be used with a cable or wire type connection points 18d, in either an upright or upside down configuration, as shown, or another configuration if desired. Alternatively, a pencil or the like can be pulled against the cable or wire until taunt and a mark made on the backside of the mountable object; and then the alignment notch aligned with the mark as the connection point. Referring to FIG. 1L, the marking device can be used with a hole or other type of connection point on a towel bar 18f or the like.

The marking device can be used to mark the location on a support surface or wall 26 for several types of supports and connection points. The release liner or paper coverlet can be removed and the marking device held in the hand of the user, front face out, as shown in FIG. 1a. One or more marking devices can be obtained depending on the number of connection points on the backside of the mountable object. The marking device 10 can be held adjacent the backside of the mountable device, and the connection point 18 viewed through the sighting notch 74. The apex 78 of the sighting notch, and thus the marker 58, can be aligned as desired with the connection point 18. For example, if the connection point or hardware on the mountable object is a saw tooth bracket, the apex of the marking device can be aligned with the center groove, as illustrated in FIGS. 1a and b. The marking device is attached to the backside of the mountable object and/or the connection point with the tacky adhesive. The back face of the marking device with exposed adhesive can be pressed against the backside of the mountable object and/or the connection point. The marking device and/or body can flex or bend to accommodate the surface, as shown in FIG. 1c. If the mountable object is large enough to require two or three supports, two or three marking devices can be attached at the same time.

When the mountable object is to be hung on a vertical surface or wall, as shown in FIG. 1d, the mountable object with the marking block attached can then be held up against the surface where the mountable object is to be hung. A level 86 can be removably attached to the mountable device to assist the user is positioning the mountable object in the correct alignment. The mountable object is supported against the surface with the front slidable face of the marking device and body. The mountable object and the marking device can be slid over the surface until a desired position is found. The mountable object is then pressed against the surface, compressing the body and exposing the marker to mark a location of a support on the surface. A support, such as a nail, hook, or the like can then be secured to the surface at the mark, and the mountable object hung from the support.

It will be appreciated that the marking device of the present invention works as well with horizontal and angled surfaces as it does with vertical surfaces. For example, a mountable object, such as a free-standing sculpture or model, can be placed on top of a horizontal surface and held in place by gravity, while still being free to slide over the surface on the slidable front face of the marking device until reaching its final position.

The compressible body can be made sufficiently stiff and rigid to support a portion of the weight of the mountable object as it rests against or on the vertical, horizontal or angled surface, so as to prevent the marker from projecting beyond the front face and scratching the surface while the mountable object is being slid into position. However, once the mountable object is correctly positioned and aligned, the user can apply a greater force to the frame or mountable object, such as a push or shove, that is sufficient to compresses the body and cause the marker to project to at least the front face and mark the location of the support on the surface. The marking device can "blindly" mark the surface in response to the push or shove of the user, since the mountable object can often be between the user and the marking device and prevent the user from observing the actual projection of the implement and marking of the surface.

Once the location of the support is marked on the vertical surface or wall, the mountable object can be taken down away from the surface and the marking device removed from the backside. The anchor support can be installed into the surface in the correct location, and the mountable object mounted on the support.

The marking device of the present invention provides several advantages over the prior art, such as allowing the user to position a mountable object, such as a picture frame, on a vertical surface or wall, and mark the location for an anchor support "blindly" while keeping both hands on the mountable object or picture frame at all times. The user can also support the mountable object from the bottom and sides, which is a safer and more convenient position when dealing with large and heavy objects. This can be contrasted with certain prior art methods that require the user to first hang a picture frame on a temporary bracket, and then move the bracket and picture frame together over the surface to the final position. Unfortunately, bracket-type hanging aids require the user to support the mountable object from above, which can be difficult or even dangerous with larger objects. They also usually require the user to stand directly in front of the mountable object to provide the necessary support, which can block the view of a second person aligning the mountable object with adjacent structures or other objects on the wall. With the present invention, the user can take advantage of the wall or surface itself to help support the object, and can either step to the side or crouch down while propping up the mountable object from the bottom, to get out of the line-of-sight of the second person assisting with positioning and alignment. In addition, the sighting notch allows the apex and/or the marker to be aligned with the connection point, without covering the mounting point.

In another aspect of the present invention, additional non-marking blocks can be provided to assist with supporting and sliding the mountable object over the surface. The non-marking blocks can be made identical to the marking blocks with both a front face with a smooth, slidable surface and a back face with an adhesive surface, but without the alignment notch and marking implement imbedded in the compressible middle layer. The additional non-marking blocks can be removably attached at other, possibly lower locations on the mountable object to form a base configuration which allows the user to slide the mountable object on both the marking and non-marking blocks over the surface. The additional non-marking blocks can be beneficial by providing extra slidable surfaces to make it easier to slide the mountable object over the surface, creating a gap between surface and the sharp edges and corners of the mountable object to avoid scratching or marring the surface, and orientating the mountable object so that it is parallel with the surface to provide a more accurate representation of its final appearance during the positioning process.

As can be appreciated by one having skill in the art, the non-marking blocks can be especially useful with horizontal and angled surfaces, by providing additional stabilizing and slidable support points to better distribute the weight of the mountable object on the surface.

The additional non-marking blocks can be provided without the alignment notch or in a different color to distinguish the non-marking blocks from the marking block. Both the marking and non-marking blocks can be provided in a variety of shapes, sizes and with controllable stiffness in the compressible middle layer, in order to accommodate the wide variety of frames and support systems. For instance, if a hanger wire is stretched across a deep recess in the backside of a mountable object such as a picture frame, the marking block can be made with a thickness sufficient to project beyond the recess and contact the surface before the sides of the frame when held up against the wall or surface. In another aspect of the present invention, marking blocks configured for use with larger mountable objects can be formed with a middle layer having a greater stiffness, in order to counteract the greater weight of the objects and prevent the marking implement from accidentally projecting beyond the front face and scratching the surface if the mountable object is inadvertently leaned against the surface with too much weight.

Figure 3:
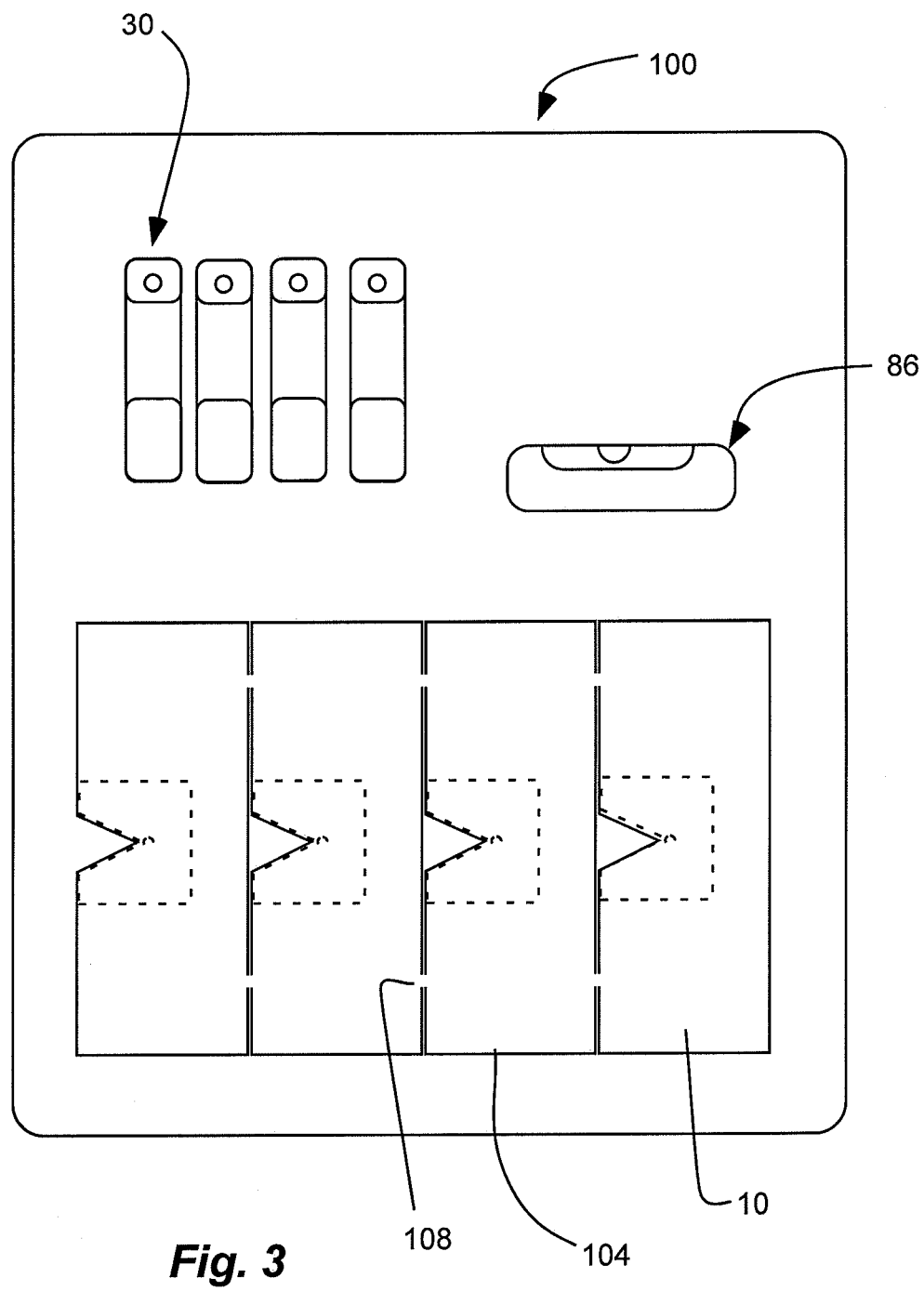
FIG. 3 is a front schematic view of a kit in accordance with an embodiment of the present invention.

Referring to FIG. 3, a plurality of marking devices 10 as described above can be provided in a kit 100 along with a level 86 and a plurality of supports 30 disposed in packaging. The plurality of marking devices can be formed of a continuous, single sheet of foam 104. The compressible foam body of each of the plurality of making devices is coupled to an adjacent foam body of an adjacent marking device by at least one foam attachment 108 that is smaller than the foam bodies and breakable to separate adjacent foam bodies. The marking devices 10 can be fabricated in bulk by obtaining a large sheet of foam.

The markers, such as the pins with the marker plates or heads, can be inserted into the foam sheet at predetermined locations. The pins can be inserted into the back face of the foam until the marker plates or heads abut to the back face. An adhesive can be applied, such as by spraying adhesive or applying an adhesive film, onto the back face of the foam and the back of the marker plates or heads. Alternatively, the adhesive can be applied prior to inserting the pins so that the adhesive is on the back face of the foam, but no on the back of the marker plates or heads. A release liner or paper coverlet can be placed over the adhesive on the foam sheet. A cutting die with a plurality of blades shaped as the plurality of marking devices and/or bodies can be stamped onto the front face of the foam, cutting or segmenting the sheet into the plurality of marking devices and/or bodies. As described above, foam attachment points can be left uncut between adjacent devices and/or bodies so that they remain together until separated. The cutting die can cut through the foam as well as the marker plates or heads of the pins.

Referring to FIGS. 4a-d, another marking device 10b is shown that is similar in many respects to that described above, and which description is herein incorporated by reference. The device 10b has a marker 58 that is disposed adjacent the apex 78 of the sighting notch 74, but within the sighting notch itself, and outside a perimeter of the body 34. Locating the marker 58 in the sighting notch 74 can facilitate alignment of the marker with the connection point of the mountable object.

The marker 58 can abut to, and/or be partially disposed in, the perimeter edge of the sighting notch so that the side walls of the body can provide support to the marker.

Figure 5A:
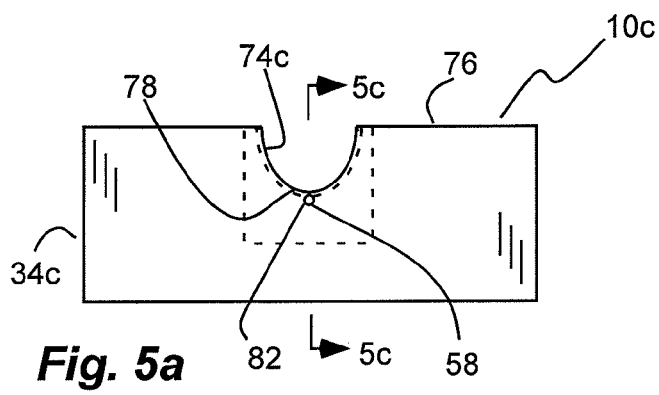
FIG. 5a is a front view of another marking device in accordance with another embodiment of the present invention.
Figure 5C:
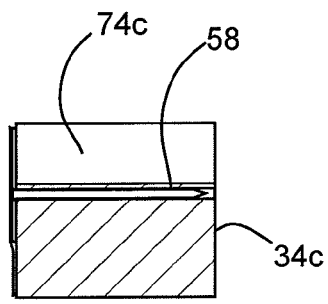
Figure 5B:
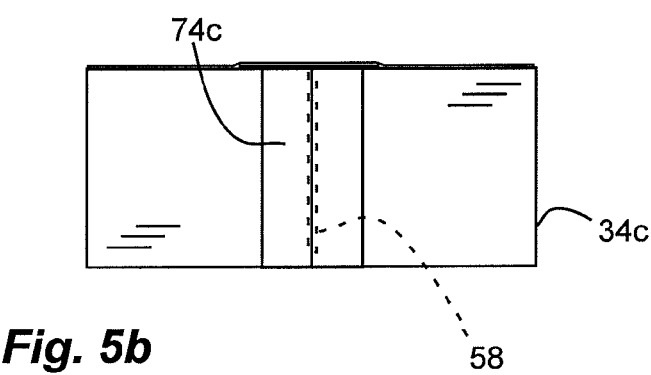

Referring to FIGS. 5a-c, another marking device 10c is shown that is similar in many respects to those described above, and which descriptions are herein incorporated by reference. The device 10c has a sighting notch 74c which is U-shaped with a curved perimeter edge. The U-shaped sighting notch 74c can be wider and can provide better visibility through the sighting notch to the connection point of the mountable object. The marker 58 can be disposed adjacent the apex of the sighting notch within a perimeter edge of the body 34c, as shown. Alternatively, the marker can be located within the sighting notch itself, and outside a perimeter of the body 34, as described with respect to FIGS. 4a-c.

Figure 6A:
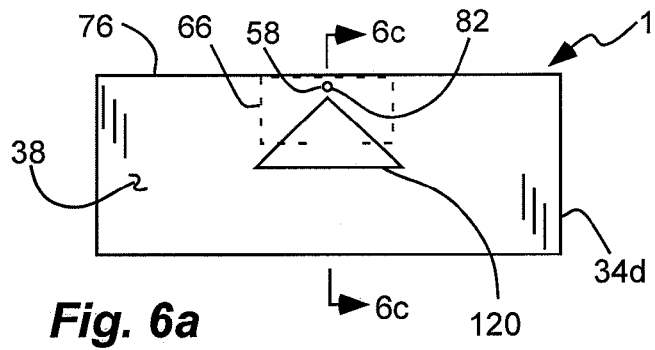
FIG. 6a is a front view of another marking device in accordance with another embodiment of the present invention.
Figure 6C:
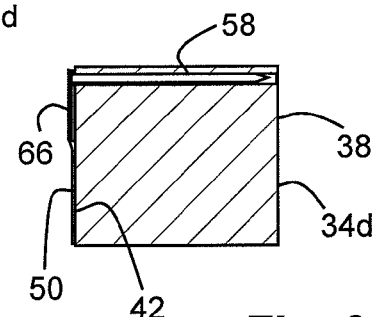
Figure 6B:
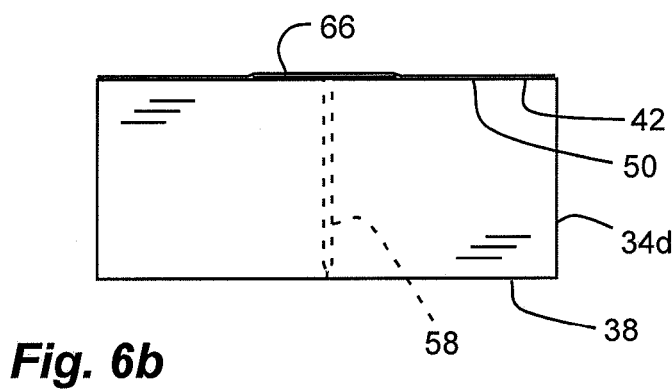

Referring to FIGS. 6a-c, another marking device 10d is shown that is similar in many respects to those described above, and which descriptions are herein incorporated by reference. The marking device 10d has a body 34d, such as a compressible foam body, having a front face 38 and a back face 42. The front face 38 is configured for slidable contact against a surface. In addition, the front face is displaceable towards the back face to reduce a thickness of the body under an applied force defining a compressed configuration. Furthermore, the front face is displaceable away from the back face to increase a thickness of the body defining an uncompressed configuration. A tacky adhesive 50 can be applied to or coupled to the back face of the body. The adhesive is an example of one means for removably coupling the back face of the body to a backside of a mountable object at a connection point for the support. A marker 58 is coupled to the body and disposed below the front face in the uncompressed configuration, and projects at least to the front face to mark the surface in the compressed configuration. The shape of the marking device and/or body 34d is rectilinear, without an indentation or sighting notch. The marker 58 is disposed adjacent a perimeter edge 76 of the body 34d and an indicator 120 indicates the location of the marker. The marker can be closer to the perimeter edge of the body in one direction than three sequential directions ninety degrees from the one direction and one another, as shown. The indicator 120 can be indicia, such as an arrow or the like, printed on the front face 38 of the body. The marker 58 can be located within the perimeter edge of the body, and can be disposed in, or can form, a cavity or bore 82 open to the front face 38 so that the location of the marker is visible. The indicator alone, or in combination with the bore 82, is one example of means for identifying a location of the marker with respect to the body, and for aligning the marker with the connection point of the mountable object. Positioning the marker at the perimeter edge of the device and/or body can facilitate positioning and alignment of the marker with the connection point of the mountable device.

Figure 7A:
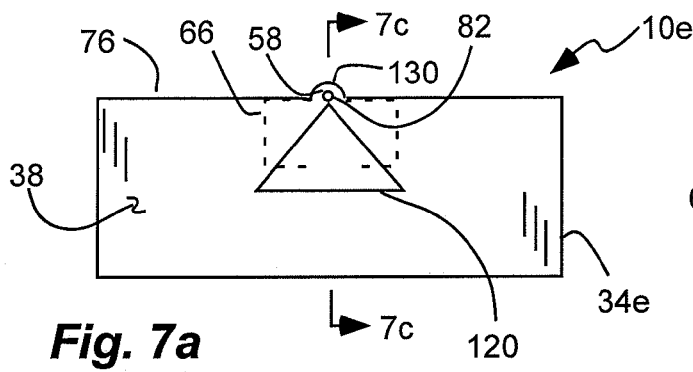
FIG. 7a is a front view of another marking device in accordance with another embodiment of the present invention.
Figure 7C:
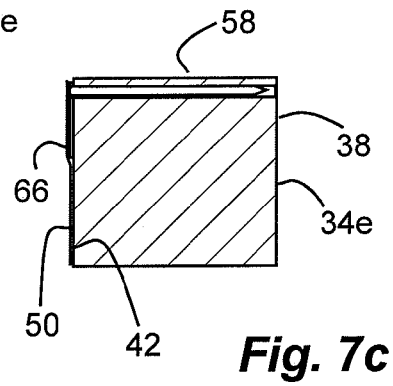
Figure 7B:
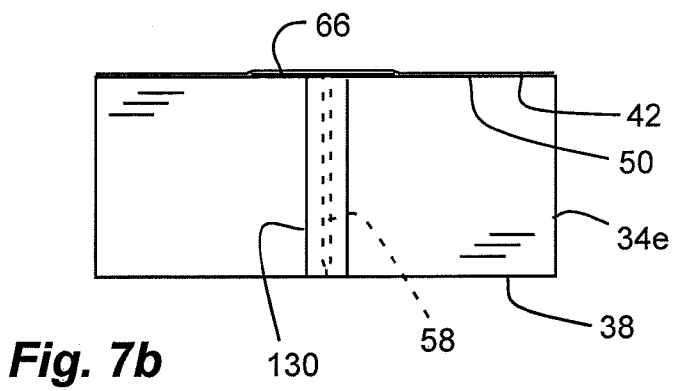

Referring to FIGS. 7a-c, another marking device 10e is shown that is similar in many respects to those described above, and which descriptions are herein incorporated by reference. The shape of the marking device and/or body 34e is rectilinear, without an indentation or sighting notch, but with a protrusion or sighting bump 130. The marker 58 is disposed adjacent a perimeter edge 76 of the body 34e, and within the protrusion or sighting bump 130. The marker can be located at an apex of the protrusion or sighting bump. In addition, an indicator 120 indicates the location of the marker. The protrusion or sighting bump 130 alone, or in combination with the bore 82 and/or indicator 120, is one example of means for identifying a location of the marker with respect to the body, and for aligning the marker with the connection point of the mountable object. Positioning the marker at the perimeter edge of the device and/or body, and in the protrusion or sighting bump, can facilitate positioning and alignment of the marker with the connection point of the mountable device.

Referring to FIGS. 8a-12b, another marking device 10f is shown that is similar in many respects to those described above, and which descriptions are herein incorporated by reference. The marking device 10f includes an elastic and collapsible/buckling structure that is flexible and can buckle under an applied force to expose the marker or indicator or tip thereof, and that is resilient to return to its original configuration to cover the marker or indicator or tip thereof, and is elastic to bias the structure in its non-compressed configuration.

The marking device 10f has a body 34f with a front face 38f and a back face 42f. In addition, the body 34f can have a front plate 140 and a back plate 144. The front and back faces can be or can face opposite one another. The front plate can have the front face and the back plate can have the back face. The front and back plates can form part of the body. The front face can be slick or low-friction and configured for slidable contact against a surface 26, such as a wall. The back face and back plate can be removably coupled to the mountable object 22, such as the picture frame or backing. A tacky and releasable adhesive 50f or adhesive layer, such as double sided tape, can be disposed on the back face of the body or back plate to removably couple the back face of the body to the mountable object. Other means can be used for removably coupling the back face of the back plate to a backside of a mountable object at a connection point for the support.

Figure 11A:
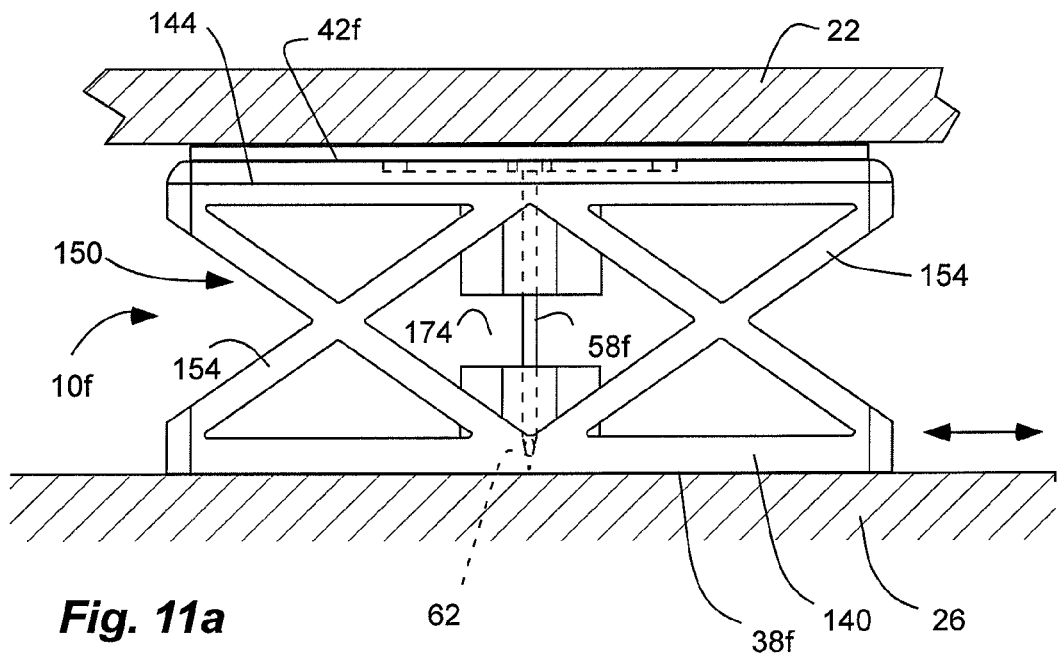
FIG. 11a is a bottom schematic view of the marking device of FIG. 8a shown in a thicker, non-compressed configuration.
Figure 11B:
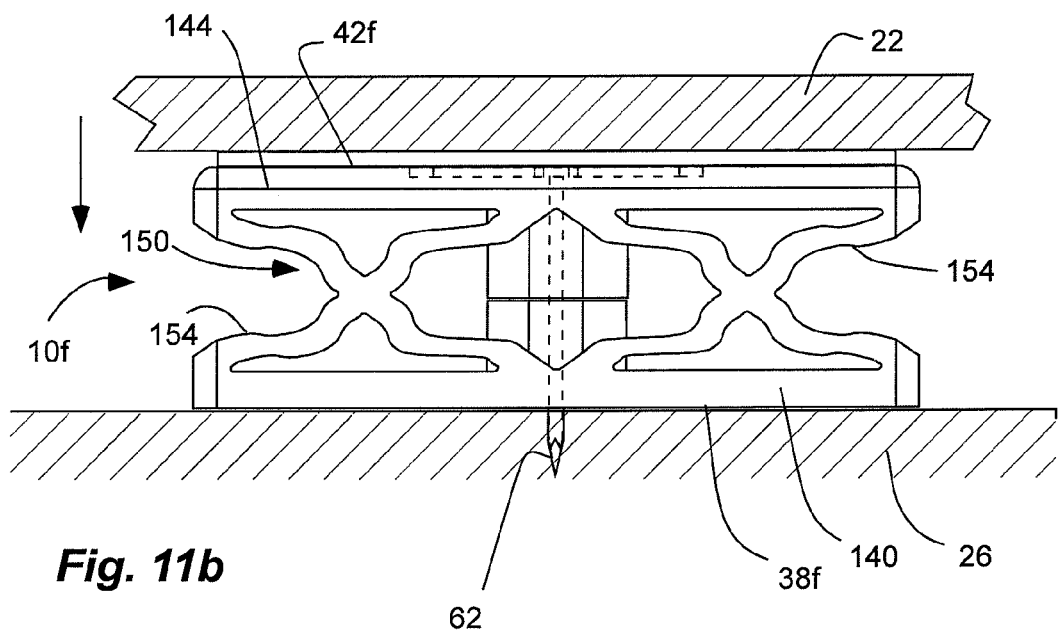
FIG. 11b is a bottom schematic view of the marking device of FIG. 8a shown in a thinner, compressed configuration.
Figure 12A:
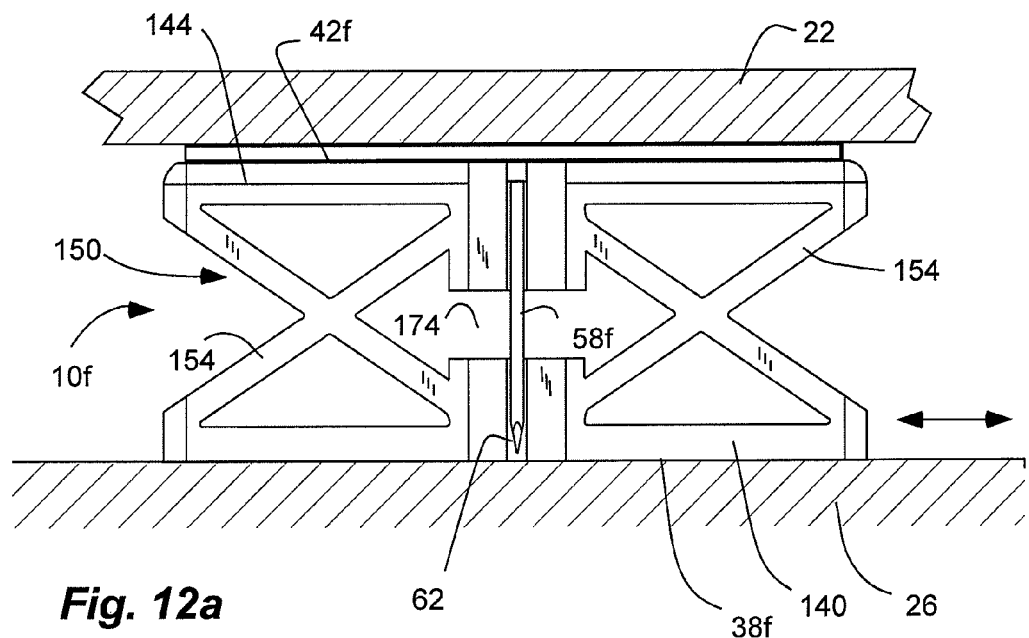
FIG. 12a is a top schematic view of the marking device of FIG. 8a shown in a thicker, non-compressed configuration.
Figure 12B:
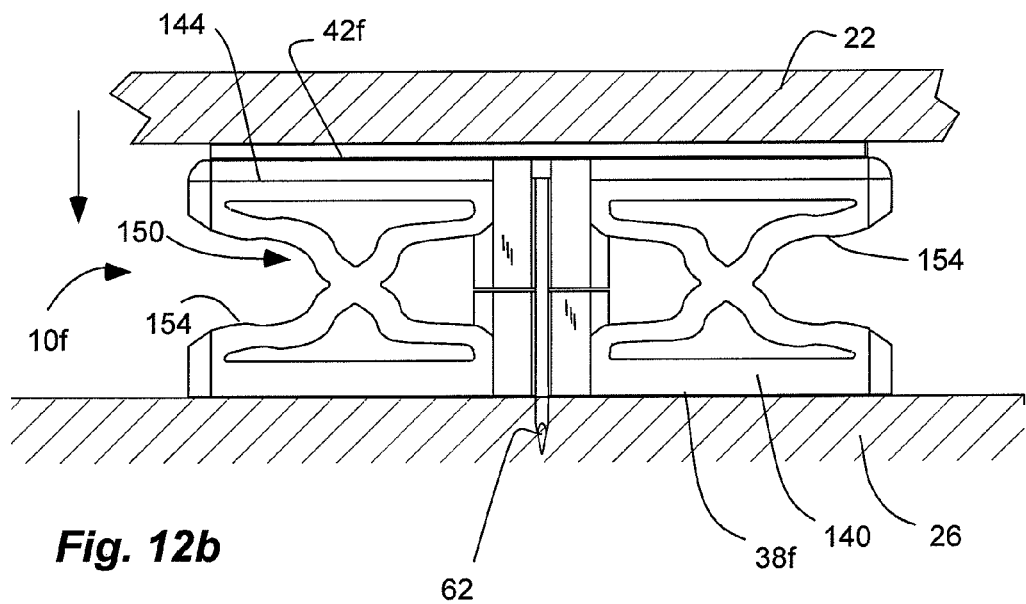
FIG. 12b is a top schematic view of the marking device of FIG. 8a shown in a thinner, compressed configuration.

The front face and front plate can be displaceable towards the back face and the back plate under an applied force to reduce a distance between the two faces, and defining a compressed configuration, as shown in FIGS. 11b and 12b. In addition, the front face and the front plate can be displaceable away from the back face and the back plate to increase the distance between the two faces, and defining an uncompressed or thicker configuration, as shown in FIGS. 11a and 12a.

The body 34f can also include an elastic buckling frame 150 or framework disposed between the front and back plates and/or faces. The frame can form at least a portion of the body, along with the plates; and the frame and plates can be formed integrally together at the same time, such as by injection molding. The frame 150 can be flexible and resilient and/or can include a flexible and resilient material. Thus, the frame can be flexible to buckle under the applied force in the compressed (or buckled or collapsed) configuration, and resilient to return to its original uncompressed or thicker (unbuckled or un-collapsed) configuration, and to bias the front and back faces away from one another. The elastic frame 150 can include elastic and collapsible cross-braces 154 that extend between the front and back plates or faces. The cross-braces 154 can include a flexible and resilient material such that the cross-braces buckle under the applied force in the compressed configuration and return to their original shape in the uncompressed configuration upon removal of the applied force. For example, the frame can include, and the cross-braces 154 can be configured to include, a pair of crisscrossing braces 158 on each side of the marker. Thus, a pair of cross-braces can be formed in a crisscross or x-shaped configuration, with a pair of the crisscross or x-shaped configurations between the plates, one on each side of the marker. The cross-braces can be formed at an incline and transverse with respect to the plates and faces. The cross-braces and the front and back plates can have a similar thickness. In addition, the cross-braces can form cavities with triangular cross-sectional shape in pairs between the plates or faces. Furthermore, the cross-braces can form a diamond shaped cavity located at the marker. The size of the cavities and the cross-braces can be on the same order, with the cavities being larger than the cross-braces, so that the cross-braces can displace and bend into the cavities when buckling or collapsing.

The marker 58f can be coupled to the back plate 144 or face 42f and disposed below the front face 38f in the uncompressed configuration. The marker 58f can be a pointed pin having a hard, pointed tip 62 positioned near the front face but below the front face in the thicker, uncompressed configuration. The marker can remain behind or below the front face of the marking device or body during attachment of the marking device or body to the mountable object and/or connection point, and subsequent movement of the mountable object towards the proper location. The marker or tip 62 can project to at least the front face in the compressed configuration (FIG. 11b) so that it can contact and/or penetrate the support surface and leave a mark, scratch or indentation. Once the mountable object is positioned correctly, the implement can be caused to project out of the front face to mark the location of an anchor or support upon which the mountable object is to be positioned, hung or otherwise attached. This can be accomplished by compressing the marking block through pressure applied directly to the mountable object. The marker 58f can also have a plate or head 66f to which the pin is mounted and supported. The plate or head 66f can abut to the back face 42f or can be disposed in a cavity 162 in the back face 42f or back plate 144 of the body. The adhesive 50f and release liner 166 can be disposed over the plate or head, and can be flat with the plate or head substantially flush with the back face 42f due to the cavity 162. In addition, the adhesive 50f can be disposed in a cavity 160 in the back face or back plate, and can extend out of the cavity. The plate or head can be rigid to support the pin, while the body extends beyond the plate or head and can be flexible to conform to the mountable object and/or connection point.

Figure 8A:
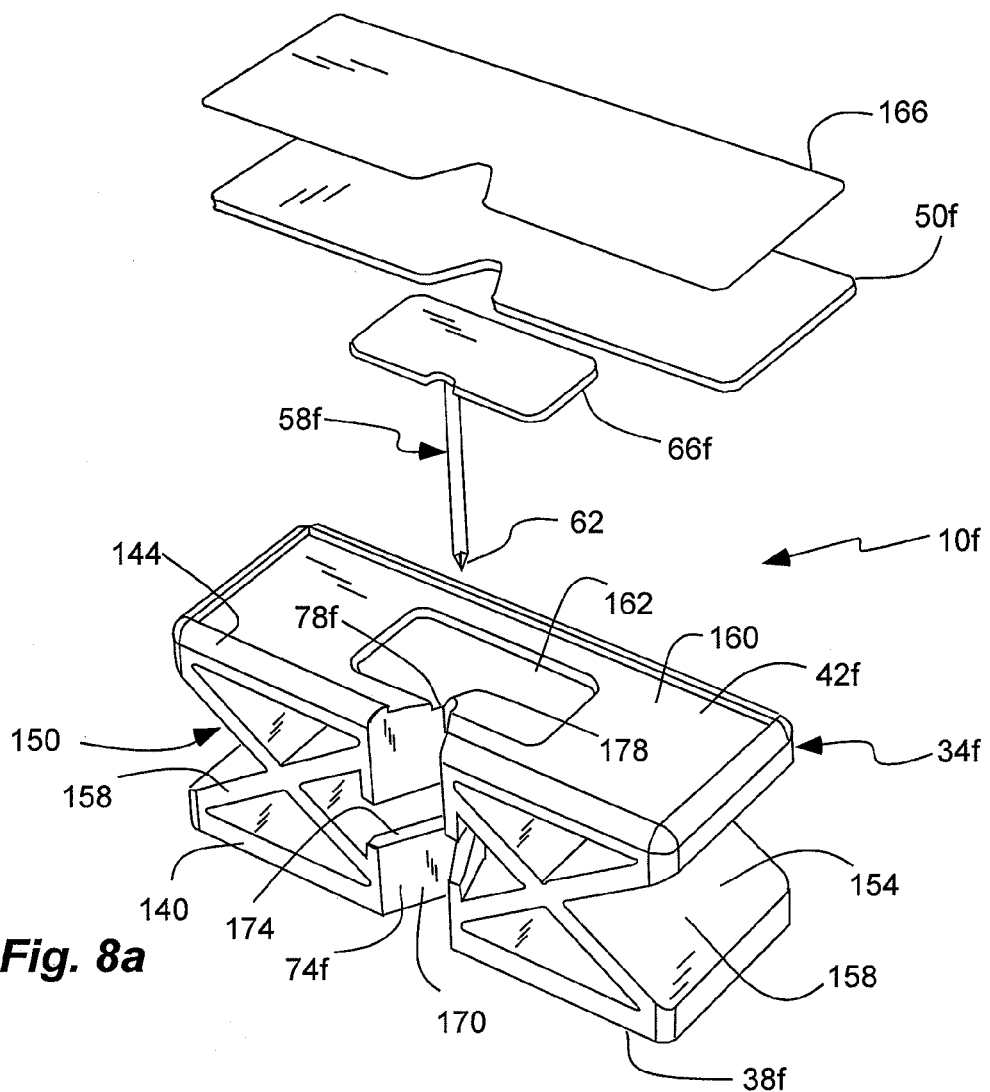
FIG. 8a is an exploded perspective view of another marking device in accordance with another embodiment of the present invention.
Figure 8B:
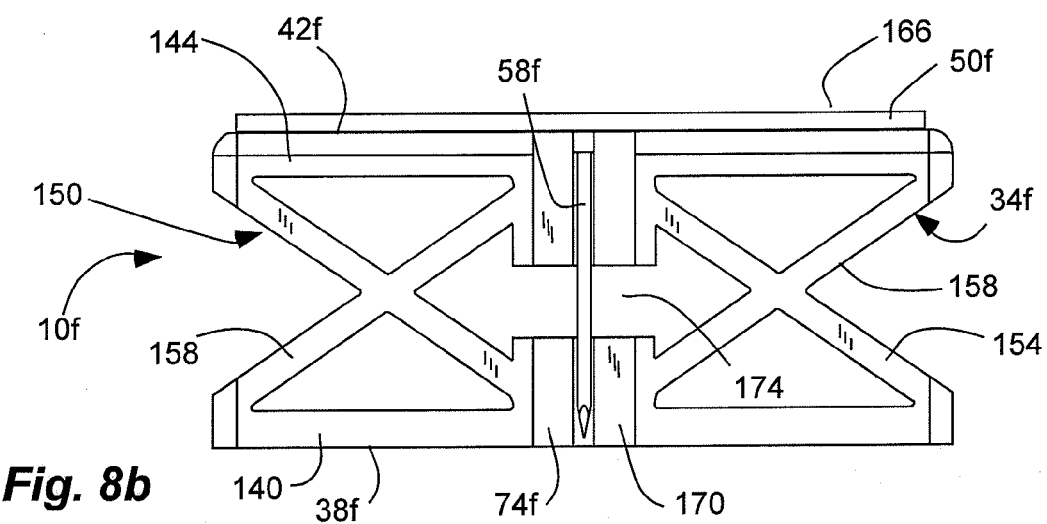
Figure 10A:
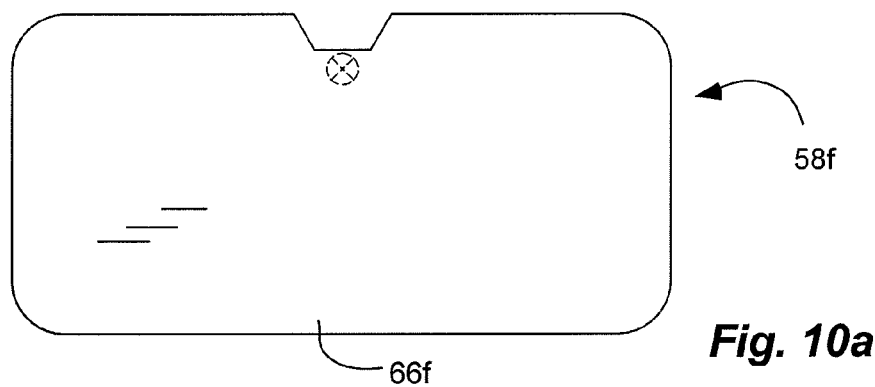
Figure 10B:
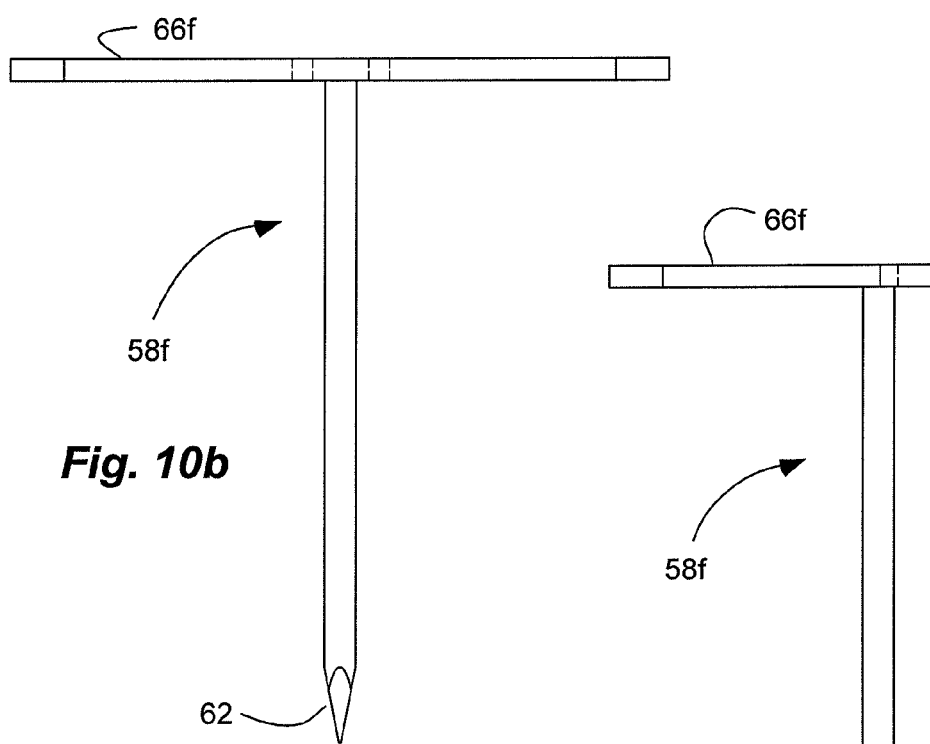
Figure 10C:
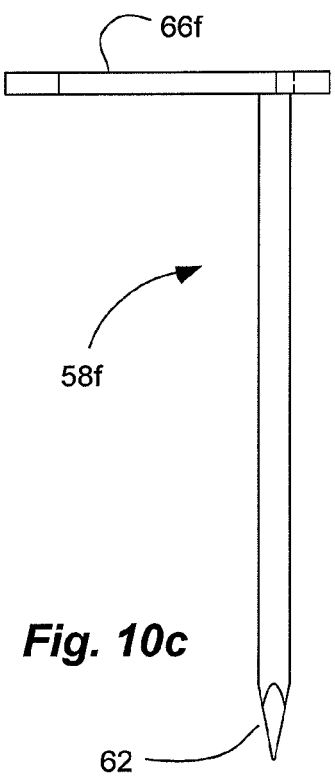

The marking device 10f or body 34f can also include a sighting notch 74f formed in a lateral perimeter edge of the body, and extending through the body from the front face 38f to the back face 42f. The sighting notch 74f can be formed in the elastic frame 150, and in the collapsible cross-braces 154. In addition, the sighting notch can extend into the plate or head 66f of the marker so that the head is notched adjacent the pin. The sighting notch 74f can include a channel wall 170 extending between the front and back faces. The channel wall 170 can be segmented to form a gap 174 between separate and collinear channel wall segments, in the uncompressed configuration (FIGS. 8b and 11a). The channel wall segments can come together and substantially abut one another in the compressed configuration (FIG. 11b), closing the gap. The channel wall segments can act as a stop to further compression of the body or collapsing of the cross-braces or frame. The sighting notch 74f is an example of means for identifying a location of the marker with respect to the faces or plates and for aligning the marker with a connection point of the mountable object.

The apex 78f of the sighting notch 74f can include a groove 178 or channel that receives and surrounds the marker 58f or pin on three sides. Thus, the marker 58f or pin thereof can be disposed adjacent the apex of the sighting notch, and adjacent a lateral perimeter edge of the body or plates, and can be disposed outside of the body, or can be exposed and visible. Thus, the marker or pin can be visible in the groove and apex of the sighting notch to facilitate positioning of the marking device 10f on the mountable object. Alternatively, the marker or pin can be disposed adjacent the apex of the sighting notch, but inside the body.

The body 34f, front and back plates 140 and 144, frame 15, cross-braces 154 and channel wall 170 can all be integrally formed together at the same time, such as by injection molding; and can be formed of an elastic, flexible and resilient material, such as thermoplastic elastomer (TPE).

Referring to FIGS. 13a-c, the marking device 10f can include a rigid safety key or plug 180 removably disposable in the buckling frame 150 to resist buckling of the cross-braces 154 and exposure of the marker 58f or tip 62. In addition, the key 180 can substantially filling the gap 174 between the channel walls 170 to resist the walls from coming together and exposing the marker 58f or tip 62. Furthermore, the key 180 can span the sighting notch 74f. The key 180 can be formed of plastic, and can be harder, or more rigid than the buckling frame. In addition, the key can have a contrasting color with respect to the buckling frame to call attention to the safety key. The key can have a narrower neck 184 that is disposable in the gap 174; and enlarged opposite ends 188 disposable between the cross-braces or crisscrossing braces. The enlarged ends 188 can have triangular cross-sectional shapes that fit opposing spaces in the crisscross or x-shaped configuration of the crisscross braces or cross-braces. The enlarged ends can be sized and shaped to match the cross-braces and/or crisscrossing braces. The key 180 can have a depth substantially the same as a depth of the marking device, and thus that extends through the device from one side to the other, or from a top to the bottom of the device. The narrower neck 184 can span the gap between the channel walls 170 of the notch 74f. Thus, pressure or force against the device, such as by a user's finger, is transmitted through the channel walls and the key to force the adhesive against the mountable object, rather than collapsing the structure and displacing the channel walls towards one another. A hole or indentation 192 can be formed in the key, at the narrower neck 184, to facilitate removal of the key from the buckling frame. The hole 192 can be a thru hole to facilitate sighting through the thru hole to position the device. The hole 192 can be aligned with the sighting notch. A slot 196 can be formed in the key, at the narrower neck 184, to accommodate the marker 58f, such as by sliding by the marker upon insertion and/or removal. In addition, the sighting notch can also be formed, or partially formed, in the key or plug. In use, the safety key 180 allows a user to press against the marking device and/or buckling frame to press the adhesive against the mountable object 22, such as the picture frame or backing, without collapsing the buckling frame and exposing the tip 62. After the marking device has been secured to the mountable object, the safety key can be removed, such as by placing a pointed tip of a pencil or the like into the hole or indentation, and sliding the key from the buckling frame.

As described above, the primary marker can be pin that can mark the surface, such as drywall, by indenting into the surface. Some mountable objects, such as soap dispensers, paper towel dispensers, tampon receptacles, ADA grab bars, however, may need to be mounted on hard surfaces. Some surfaces, however, such as tile, stone, metal or glass, are hard, and not susceptible to being marked by indentation. Thus, the marking device can be provided with a secondary marker having a marking pad with a transferable medium, such as chalk, that can be removably carried by the marking device to mark hard surfaces. The secondary marker can be separate and discrete from the primary marker. In addition, the secondary and primary markers can be different and can mark differently.

Figure 14:
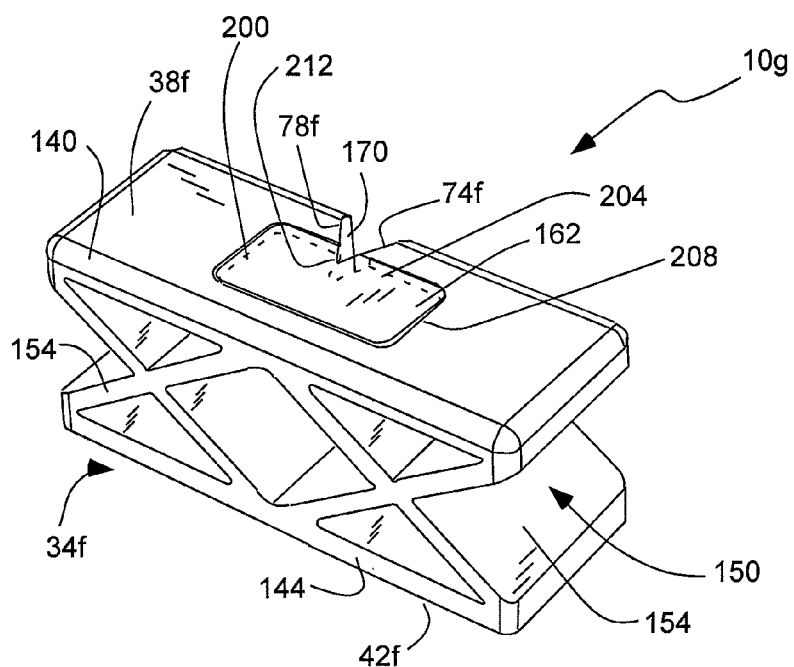
FIG. 14 is a perspective view of another marking device in accordance with another embodiment of the present invention.

Referring to FIG. 14, another marking device 10g is shown that is similar in many respects to those described above, and which description is hereby incorporated herein by reference. The marking device 10g can include a secondary marker 200 coupled to the body 34f and having a marking pad 204 extending adjacent to the front face 38f of the body. The front face 38f or front plate 140 can include an indentation 208 adjacent to and/or partially surrounding the sighting notch 74f. The secondary marker 200 and/or the marking pad 204 can be removably disposed in the indentation 208, and thus recessed with respect to the front face 38f. In one aspect, the exterior face of the marking pad 204 can be recessed with respect to the front face 38f of the body slightly, so that pressure or force against the marking device will cause the exterior face of the marking pad 204 to come into contact with the surface to be marked. In another aspect, the exterior face of the marking pad 204 can be substantially flush with respect to the front face 38f of the body. In another aspect, the exterior face of the marking pad 204 can extend beyond the front face 38f of the body. In any event, the exterior face of the marking pad 204 can be adjacent the front face 38f. The marking pad can include a transferable medium carried by the marking pad and transferable to the surface to be marked. For example, the marking pad can be felt or other fibrous material, and the transferable medium can be chalk, ink, etc. The marking pad can be releasably adhered by a releasably adhesive in the indentation. In another aspect, the marking pad can be releasably adhered by a releasable adhesive, such as an adhesive film, to the front face 38f of the body, without the indentation, and with the exterior surface extending beyond the front face of the body. The secondary marker 200 and/or marking pad 204 can be shaped similar to the sighting notch 74f in the body, and can include a sighting notch 212 formed in the marking pad and extending therethrough, and aligned with the sighting notch 74f in the body. In another aspect, the marking pad can have another shape and location to indicate or mark the location of an anchor or support upon which the mountable object is to be positioned, hung or otherwise attached, such as triangular or an arrow with a top pointing to the apex of the sighting notch. The secondary marker 200 can be coupled to marking device 10g when it is desired to mark a hard surface. Thus, the marking device 10g can mark common surfaces, such as drywall, with the primary marker 58f or pin, and hard surfaces with the secondary marker 200 utilizing the same marking device so that the marking device can be used to mark both harder and softer surfaces.

Referring to FIGS. 15a-c, another marking device 10h is shown that is similar in many respects to those described above, and which description is hereby incorporated herein by reference. The marking device 10h can include a secondary marker 300 coupled to the body 34f and having a marking pad 304 extending adjacent to the front face 38f of the body. The secondary marker 300 can include a block or stud 308 removably extending from a proximal end at the safety key 180 to a distal end adjacent the front face 38f of the body. A pin 312 can from the proximal end of the block or stud, and can be removably disposed in the hole 192 of the safety key. The marking pad 304 can be disposed on the distal end of the block or stud. As described above, in one aspect, the exterior face of the marking pad 304 can be recessed with respect to the front face 38f of the body slightly, so that pressure or force against the marking device will cause the exterior face of the marking pad 304 to come into contact with the surface to be marked. In another aspect, the exterior face of the marking pad 304 can be substantially flush with respect to the front face 38f of the body. In another aspect, the exterior face of the marking pad 304 can extend beyond the front face 38f of the body. In any event, the exterior face of the marking pad 304 can be adjacent the front face 38f. Also as described above, the marking pad can include a transferable medium carried by the marking pad and transferable to the surface to be marked. For example, the marking pad can be felt or other fibrous material, and the transferable medium can be chalk, ink, etc. The body or stud can be sized and shaped to fit in the sighting notch 74f of the body. For example, the body or stud can be triangular, or have a triangular cross-sectional shape. Thus, the marking pad can also have a triangular shape to leave a triangular mark on the hard surface. The secondary marker 300 can be coupled to marking device 10h when it is desired to mark a hard surface. Thus, the marking device 10h can mark common surfaces, such as drywall, with the primary marker 58f or pin, and hard surfaces with the secondary marker 300 utilizing the same marking device so that the marking device can be used to mark both harder and softer surfaces.

Figure 16:
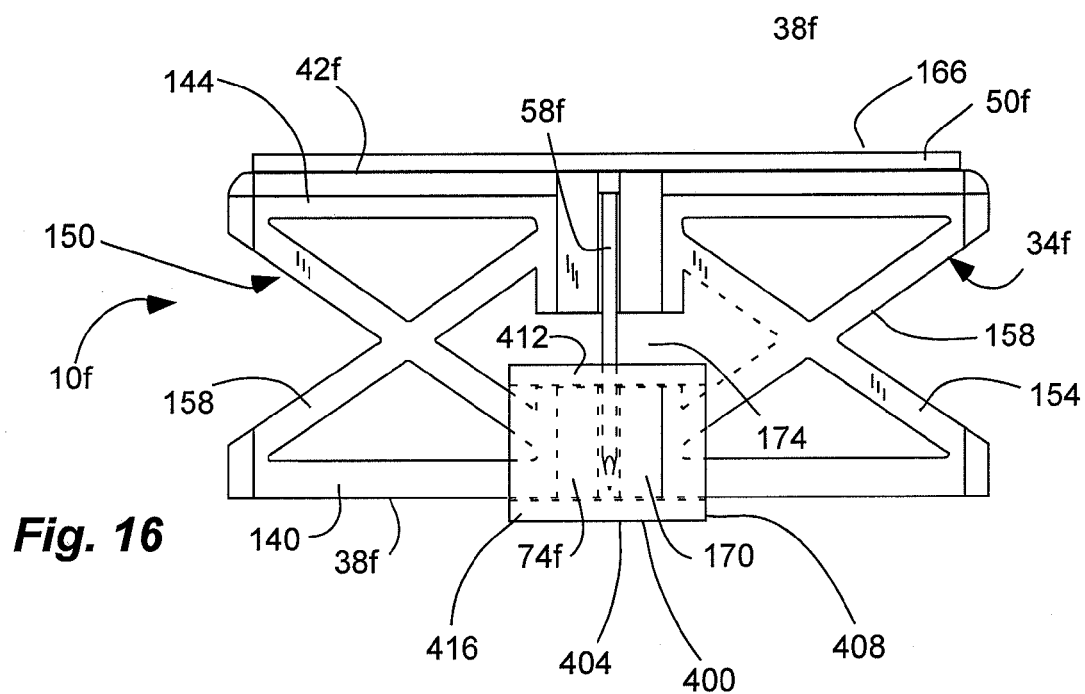
FIG. 16 is a top view of another marking device in accordance with another embodiment of the present invention.

Referring to FIG. 16, another marking device 10i is shown that is similar in many respects to those described above, and which description is hereby incorporated herein by reference. The marking device 10i can include a secondary marker 400 coupled to the body 34f and having a marking pad 404 extending adjacent to the front face 38f of the body. The secondary marker 400 can include a clip 408 with a rear wall 412 engaging the body 34f, and a front wall 416 disposed over the front face 38f of the body, and across the sighting notch 74f. The clip can have a U-shaped cross-section with a wall connecting the front and rear walls. The rear wall can extend into the body when the safety key is removed. The marking pad 404 can be disposed on the front wall 416 of the clip, and across the sighting notch. Thus, the exterior face of the marking pad can extend beyond the front surface of the body. As described above, the marking pad can include a transferable medium carried by the marking pad and transferable to the surface to be marked. For example, the marking pad can be felt or other fibrous material, and the transferable medium can be chalk, ink, etc. Again, in one aspect, the marking pad can be shaped can be shaped similar to the sighting notch 74f in the body, and can include a sighting notch formed in the marking pad, and aligned with the sighting notch 74f in the body. In another aspect, the marking pad can have another shape and location to indicate or mark the location of an anchor or support upon which the mountable object is to be positioned, hung or otherwise attached, such as triangular or an arrow with a top pointing to the apex of the sighting notch. In one aspect, the front wall can have a window with the marking pad disposed across the window, and with the primary marker 58f bearing against the marking pad under force or pressure to mark the surface. The secondary marker 400 can be coupled to marking device 10i when it is desired to mark a hard surface. Thus, the marking device 10i can mark common surfaces, such as drywall, with the primary marker 58f or pin, and hard surfaces with the secondary marker 400 utilizing the same marking device so that the marking device can be used to mark both harder and softer surfaces. The clip can be formed of plastic, and can be transparent so that the sighting notch can be visible through the clip.

A method for using the secondary marker includes attaching a secondary marker to the body, and aligned with the sighting notch. The secondary marker can be removably attachable to the body, and be attached to the body prior to attaching the marking device to the backside of the mountable object or the connection point thereof, or subsequent to attaching the marking device to the backside of the mountable object or the connection point thereof. The mountable object can be pressed against the surface to press the marking pad of the secondary marker against the surface, and to mark a location of a support on the surface with the secondary marker.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A marking device for marking the location for a support for a mountable object, the device comprising:
   a body having a front face and a back face, the front face being configured for contact against a surface;
   an adhesive coupled to the back face of the body configured to removably couple the back face of the body to the mountable object;
   an elastic buckling frame forming at least a portion of the body and having elastic and collapsible cross-braces between the front and back faces, the cross-braces including a flexible and resilient material such that the cross-braces buckle under an applied force defining a compressed configuration in which the front face displaces towards the back face to reduce a thickness of the body, and the cross-braces return to an original configuration upon removal of the applied force defining an uncompressed configuration in which the front face displaces away from the back face to increase a thickness of the body;
   a primary marker coupled to the body and disposed below the front face in the thicker configuration and projecting to at least the front face to mark the surface in the compressed configuration; and
   a secondary marker coupled to the body and having a marking pad extending adjacent the front face of the body.

2. The marking device of claim 1, further comprising:
   a transferable medium carried by the marking pad.

3. The marking device of claim 1, further comprising:
   a sighting notch formed in a lateral perimeter edge of the body and extending through the body from the front face to the back face; and
   the primary marker being disposed adjacent an apex of the sighting notch.

4. The marking device of claim 3, wherein the sighting notch is also formed in the elastic buckling frame and the elastic and collapsible cross-braces.

5. The marking device of claim 3, wherein the primary marker is disposed within the body at the apex of the sighting notch.

6. The marking device of claim 3, wherein the secondary marker further comprises:
   an adhesive adhering the marking pad to the front face;
   a sighting notch formed in the marking pad and extending therethrough; and
   the sighting notch of the marking pad being aligned with the sighting notch of the body.

7. The marking device of claim 1, wherein the primary marker is disposed adjacent a lateral perimeter edge of the front and back faces; and further comprising means for identifying a location of the primary marker with respect to the faces and for aligning the primary marker with a connection point of the mountable object.

8. The marking device of claim 1, further comprising:
   a sighting notch formed in a lateral perimeter edge of the body and extending through the body from the front face to the back face;
   a primary marker being disposed adjacent an apex of the sighting notch;
   a rigid safety key removably disposable in the buckling frame to resist buckling of the cross-braces; and
   a hole extending through the rigid safety key and aligned with the sighting notch.

9. The marking device of claim 8, wherein the secondary marker further comprises:
   a block removably extending from a proximal end at the safety key to a distal end adjacent the front face of the body;
   a pin extending from the block and removably disposed in the hole of the safety key; and
   the marking pad disposed on the distal end of the block.

10. The marking device of claim 1, wherein the secondary marker further comprises:
    a clip with a rear wall engaging the body and a front wall disposed over the front face of the body; and
    the marking pad being disposed on the front wall of the clip.

11. The marking device of claim 1, further comprising:
    a sighting notch formed in a lateral perimeter edge of the body and extending through the body from the front face to the back face;
    the primary marker being disposed adjacent an apex of the sighting notch;
    a clip with a rear wall engaging the body and a front wall disposed over the front face of the body and across the sighting notch; and
    the marking pad being disposed on the front wall of the clip and across the sighting notch.

12. A marking device for marking the location for a support for a mountable object, comprising:
    a compressible body having a front face and a back face, the front face configured for contact against a surface, the compressible body having a compressed configuration that is thinner and a thicker configuration that is thicker than the compressed configuration;

an adhesive coupled to the back face of the compressible body;

a primary marker coupled to the compressible body and disposed below the front face in the thicker configuration and projecting to at least the front face to mark the surface in the compressed configuration;

a sighting notch formed in a lateral perimeter edge of the compressible body and extending through the body from the front face to the back face;

the primary marker being disposed adjacent an apex of the sighting notch; and a secondary marker coupled to the body and having a marking pad extending adjacent the front face of the body.

13. The marking device of claim 12, further comprising:
a transferable medium carried by the marking pad.

14. The marking device of claim 12, wherein the secondary marker further comprises:
an adhesive adhering the marking pad to the front face of the body;
a sighting notch formed in the marking pad and extending therethrough; and
the sighting notch of the marking pad being aligned with the sighting notch of the body.

15. The marking device of claim 12, further comprising:
an elastic buckling frame forming at least a portion of the body and having elastic and collapsible cross-braces between the front and back faces, the cross-braces including a flexible and resilient material such that the cross-braces buckle under an applied force in the compressed configuration, and the cross-braces return to an original configuration upon removal of the applied force in the thicker configuration.

16. The marking device of claim 15, further comprising:
a rigid safety key removably disposable in the buckling frame to resist buckling of the cross-braces; and
a hole extending through the rigid safety key and aligned with the sighting notch.

17. The marking device of claim 16, wherein the secondary marker further comprises:
a block removably extending from a proximal end at the safety key to a distal end beyond the front face of the body;
a pin extending from the block and removably disposed in the hole of the safety key; and
the marking pad disposed on the distal end of the block.

18. The marking device of claim 12, further comprising:
a clip with a rear wall engaging the body and a front wall disposed over the front face of the body and across the sighting notch; and
the marking pad being disposed on the front wall of the clip and across the sighting notch.

19. A method of marking the location of a support for a mountable object on a surface, the method comprising:
obtaining at least one marking device comprising:
a compressible or collapsible body with a front face and a back face with an adhesive;
a primary marker coupled to the body;
viewing a connection point on a backside of the mountable object through a sighting notch of the marking device and aligning an apex of the sighting notch of the marking device with the connection point;
attaching the marking device to the backside of the mountable object, the connection point, or both, with the adhesive;
attaching a secondary marker to the body and aligned with the sighting notch;
supporting the mountable object opposing the surface;
moving the mountable object until a desired position is found; and
pressing the mountable object against the surface to press a marking pad of the secondary marker against the surface and marking a location of a support on the surface with the secondary marker.

20. The method of claim 19, further comprising:
a transferable medium carried by the marking pad and transferable to the surface.

\* \* \* \* \*